(12) United States Patent
Koga et al.

(10) Patent No.: US 10,023,182 B1
(45) Date of Patent: Jul. 17, 2018

(54) HYBRID VEHICLE TRANSMISSION CONTROL DEVICE

(71) Applicant: Nissan Motor Co., Ltd., Yokohama-shi, Kanagawa (JP)

(72) Inventors: Masato Koga, Kanagawa (JP); Atsushi Tsukizaki, Kanagawa (JP); Ryohey Toyota, Kanagawa (JP); Keita Okudaira, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/739,195

(22) PCT Filed: Jun. 25, 2015

(86) PCT No.: PCT/JP2015/068320
§ 371 (c)(1),
(2) Date: Dec. 22, 2017

(87) PCT Pub. No.: WO2016/208029
PCT Pub. Date: Dec. 29, 2016

(51) Int. Cl.
*B60W 20/30* (2016.01)
*F16H 61/02* (2006.01)
(Continued)

(52) U.S. Cl.
CPC ............ *B60W 20/30* (2013.01); *B60W 10/11* (2013.01); *F16H 61/0213* (2013.01);
(Continued)

(58) Field of Classification Search
CPC ................ B60W 20/30; B60W 10/11; B60W 2510/087; B60W 2710/1005;
(Continued)

(56) References Cited

U.S. PATENT DOCUMENTS

| 5,873,426 A | 2/1999 | Tabata et al. |
| 6,083,138 A | 7/2000 | Aoyama et al. |

(Continued)

FOREIGN PATENT DOCUMENTS

| JP | 2009-149120 A | 7/2009 |
| JP | 2010-132014 A | 6/2010 |

(Continued)

*Primary Examiner* — Thomas P Ingram
(74) *Attorney, Agent, or Firm* — Global IP Counselors, LLP

(57) ABSTRACT

A transmission control device is provided for a hybrid vehicle that ensures gear shift responsiveness corresponding to a driver's request while achieving excellent gear shifting quality when shifting gears under normal conditions. The transmission control device includes a transmission controller that carries out a shift control for switching between gear shift patterns that are established by the multistage gear transmission by a movement of the engagement clutches based on a gear shift request. The transmission controller selects from among a plurality of gear shift patterns that can be established gear shift patterns in which one engagement clutch is present in a power transmission path leading from the power sources to a drive wheel, and designates the selected gear shift patterns as a normal-use gear shift pattern group, which is used for shift control under normal conditions.

17 Claims, 11 Drawing Sheets

(51) Int. Cl.
*F16H 61/12* (2010.01)
*B60W 10/11* (2012.01)

(52) U.S. Cl.
CPC ....... *F16H 61/12* (2013.01); *B60W 2510/087* (2013.01); *B60W 2510/244* (2013.01); *B60W 2510/246* (2013.01); *B60W 2710/1005* (2013.01); *B60Y 2200/92* (2013.01); *F16H 2061/0227* (2013.01); *F16H 2061/1224* (2013.01); *Y10S 903/945* (2013.01)

(58) Field of Classification Search
CPC ....... B60W 2510/246; B60W 2510/244; F16H 61/12; F16H 61/0213; F16H 2061/0227; F16H 2061/1224; Y10S 903/945; B60Y 2200/92

See application file for complete search history.

(56) References Cited

U.S. PATENT DOCUMENTS

| | | | |
|---|---|---|---|
| 8,517,876 B2* | 8/2013 | Sakai | B60K 6/387 |
| | | | 475/5 |
| 9,815,455 B2* | 11/2017 | Tsuda | B60W 20/30 |
| 2013/0186233 A1 | 7/2013 | Kaltenbach | |

FOREIGN PATENT DOCUMENTS

| | | |
|---|---|---|
| JP | 2010-196766 A | 9/2010 |
| JP | 2010-230124 A | 10/2010 |
| JP | 5453467 B2 | 1/2014 |

* cited by examiner

ENGAGEMENT TABLE

| C2 | C3 | C1 Left | C1 N | C1 Right |
|---|---|---|---|---|
| N | N | EV – ICEgen | Neutral | EV – ICE 3rd |
| N | Left | EV 1st ICE 1st | EV 1st ICE – | EV 1st ICE 3rd |
| N | Left | Lock | EV 1st ICE 2nd | Lock |
| Left | N | EV 1.5 ICE 2nd | EV – ICE 2nd | Lock |
| Left | N | Lock | EV 2nd ICE 2nd | Lock |
| N | Right | EV 2nd ICE 3rd' | EV 2nd ICE – | EV 2nd ICE 3rd |
| N | Right | Lock | EV 2nd ICE 4th | Lock |
| Right | N | EV 2.5 ICE 4th | EV – ICE 4th | Lock |
| Right | N | Lock | EV 1st ICE 4th | Lock |

 : NORMAL-USE GEAR SHIFT PATTERN

 : GEAR SHIFT PATTERN NOT NORMALLY USED

 : GEAR SHIFT PATTERN THAT CANNOT BE SELECTED BY SHIFT MECHANISM

 : GEAR SHIFT PATTERN THAT CANNOT BE SELECTED BY INTERLOCK

FIG. 4

NORMAL-USE GEAR SHIFT PATTERN (EV1st, ICE2nd)

NORMAL-USE GEAR SHIFT PATTERN (EV1st, ICE3rd)

NORMAL-USE GEAR SHIFT PATTERN (EV2nd, ICE2nd)

NORMAL-USE GEAR SHIFT PATTERN (EV2nd, ICE3rd)

NORMALLY NON-USE GEAR SHIFT PATTERN (EV1st, ICE1st) EMERGENCY 1ST

NORMALLY NON-USE GEAR SHIFT PATTERN (EV2nd, ICE3rd') MALFUNCTION GEAR SHIFT PATTERN

HYBRID VEHICLE TRANSMISSION CONTROL DEVICE

CROSS-REFERENCE TO RELATED APPLICATIONS

This application is a U.S. National stage application of International Application No. PCT/JP2015/068320, filed Jun. 25, 2015.

BACKGROUND

Field of the Invention

The present invention relates to an energy management control device for a hybrid vehicle, comprising an electric motor and an internal combustion engine as power sources, and that is provided with a transmission that switches between a plurality of gear shift patterns with an engagement clutch.

Background Information

Conventionally, a transmission comprises an ENG transmission and an MG transmission whose respective pathways are connected by one or a plurality of engagement elements, to obtain a plurality of gear shift patterns. In addition, a hybrid vehicle is known, which has a power transmission path in which, when a gear shift stage of one transmission is being used, a gear shift stage of the other transmission is used (for example, see Japanese Patent No. 5453467 refer to as Patent Document 1).

SUMMARY

However, in a conventional hybrid vehicle, the power transmission path that interposes a plurality of engagement elements is configured to be the gear shift pattern that is used in a normal shift control. Consequently, backlash is larger as compared to when only one engagement element is interposed, and, when transitioning between acceleration and deceleration, backlash shock and noise are reduced. In addition, since it is necessary to moderate the gradient of torque increase and decrease during shifting in order to suppress vibration, there is the problem that it is not possible to promptly respond to a starting request or acceleration request of the driver.

In view of the problems described above, an object of the present invention is to provide a transmission control device for a hybrid vehicle which, when there is a gear shift request, ensures gear shift responsiveness corresponding to a driver's request while achieving excellent gear shifting quality when shifting gears under normal conditions.

In order to achieve the object described above, the hybrid vehicle of the present invention comprises an electric motor and an internal combustion engine as drive sources, and is provided with a transmission that establishes a plurality of gear shift patterns in a drive system from the power sources to the drive wheel. The transmission has, a plurality of engagement clutches as shifting elements that switch between a plurality of gear shift patterns, and that are meshingly engaged by movement from a disengaged position. This hybrid vehicle is provided with a transmission controller that carries out a shift control for switching between gear shift patterns that are established by the transmission, by a movement of the engagement clutches based on a gear shift request. The transmission controller selects gear shift patterns from among a plurality of gear shift patterns that can be established by the transmission, in which one engagement clutch is present in a power transmission path leading from the power sources to the drive wheel, and designates the selected plurality of gear shift patterns as a normal-use gear shift pattern group, which is used for shift control under normal conditions.

Therefore, gear shift patterns in which one engagement clutch is present in a power transmission path leading from the power sources to the drive wheels are selected from among a plurality of gear shift patterns that can be established by the transmission, and the selected plurality of gear shift patterns are designated as a normal-use gear shift pattern group, which is used for shift control under normal conditions. That is, only one engagement clutch is present in the power transmission path in the gear shift patterns that are selected as the normal-use gear shift pattern group. Accordingly, excellent gear shifting quality is obtained, whereby it is possible to suppress backlash shock and noise unique to cases in which meshing engagement clutches are used as shifting elements when shifting gears under normal conditions. Since a normal-use gear shift pattern is a pattern in which shock and noise are suppressed, it is not necessary to take measures against vibration to moderate the gradient of torque increase and decrease during shifting, and it is possible to secure a high gear shift responsiveness, in which the time required for shifting is short. As a result, when there is a gear shift request, it is possible to ensure gear shift responsiveness corresponding to a driver's request while achieving excellent gear shifting quality when shifting gears under normal conditions.

BRIEF DESCRIPTION OF THE DRAWINGS

Referring now to the drawings, a transmission control device is illustrated for a hybrid vehicle.

FIG. 4 is an engagement table illustrating the gear shift patterns according to the switching positions of three engagement clutches in a multistage gear transmission mounted on a hybrid vehicle to which is applied the transmission control device of the first embodiment.

DETAILED DESCRIPTION OF THE EMBODIMENTS

Figure 1:
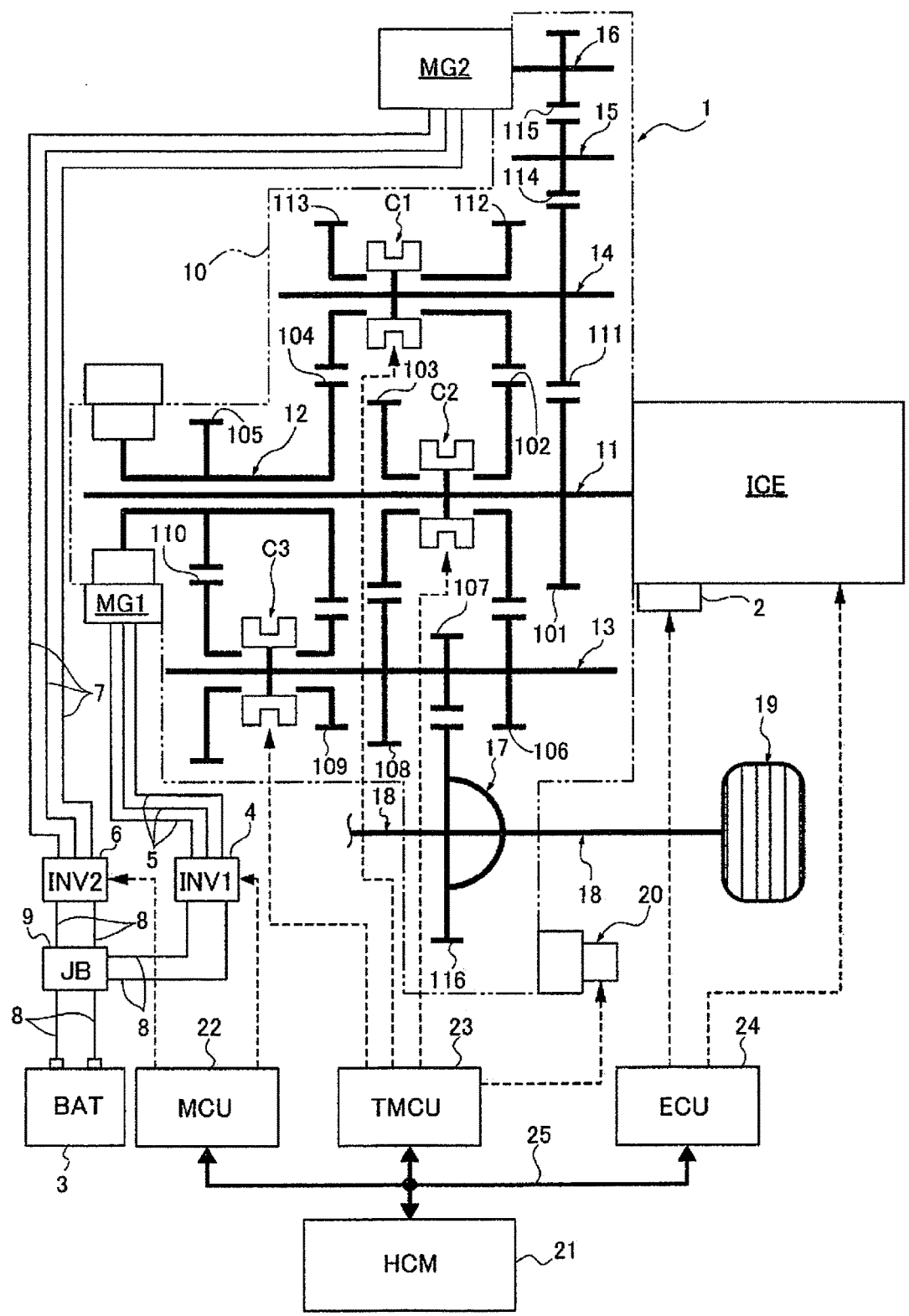
FIG. 1 is an overall system view illustrating a drive system and a control system of a hybrid vehicle to which is applied the transmission control device of the first embodiment.

A preferred embodiment for realizing the transmission control device for a hybrid vehicle of the present invention is described below, based on the first embodiment illustrated in the drawings.

First Embodiment

The configuration is described first. The transmission control device of the first embodiment is applied to a hybrid vehicle (one example of a hybrid vehicle), comprising, one engine, two motor/generators, and a multistage gear transmission having three engagement clutches as drive system components. The "overall system configuration," the "configuration of the shift control system," the "configuration of the gear shift stages," and the "configuration of the shift control process" will be separately described below, regarding the configuration of the transmission control device for a hybrid vehicle in the first embodiment.

Overall System Configuration

FIG. 1 illustrates a drive system and a control system of a hybrid vehicle to which is applied the transmission control device of the first embodiment. The overall system configuration will be described below, based on FIG. 1.

The drive system of the hybrid vehicle comprises an internal combustion engine ICE, a first motor/generator MG1, a second motor/generator MG2, and a multistage gear transmission 1 having three engagement clutches C1, C2, C2, as illustrated in FIG. 1. "ICE" is an acronym for "Internal Combustion Engine."

The internal combustion engine ICE is, for example, a gasoline engine or a diesel engine that is disposed in a front compartment of a vehicle such that the crankshaft direction is in the vehicle width direction. This internal combustion engine ICE is connected to a transmission case 10 of the multistage gear transmission 1, and the output shaft of the internal combustion engine is connected to a first shaft 11 of the multistage gear transmission 1. The internal combustion engine ICE basically carries out an MG2 start, where the second motor/generator MG2 is used as a starter motor. However, a starter motor 2 is left in preparation for when an MG2 start using a high-power battery 3 cannot be ensured, such as during extreme cold.

Both the first motor/generator MG1 and the second motor/generator MG2 are permanent magnet type synchronous motors utilizing a three-phase alternating current, having the high-power battery 3 as a common power source. The stator of the first motor/generator MG1 is fixed to a case of the first motor/generator MG1, and the case is fixed to the transmission case 10 of the multistage gear transmission 1. Then, a first motor shaft integrated to a rotor of the first motor/generator MG1 is connected to a second shaft 12 of the multistage gear transmission 1. The stator of the second motor/generator MG2 is fixed to a case of the second motor/generator MG2, and the case is fixed to the transmission case 10 of the multistage gear transmission 1. Then, a second motor shaft integrated to a rotor of the second motor/generator MG2 is connected to a sixth shaft 16 of the multistage gear transmission 1. A first inverter 4, which converts direct current to three-phase alternating current during powering and converts three-phase alternating current to direct current during regeneration, is connected to a stator coil of the first motor/generator MG1, via a first AC harness 5. A second inverter 6, which converts direct current to three-phase alternating current during powering and converts three-phase alternating current to direct current during regeneration, is connected to a stator coil of the second motor/generator MG2, via a second AC harness 7. The high-power battery 3, the first inverter 4, and the second inverter 6 are connected by a DC harness 8, via a junction box 9.

The multistage gear transmission 1 is a normally meshing transmission comprising a plurality of gear pairs having different transmission ratios, and comprises six gear shafts 11-16 provided with gears and disposed parallel to each other inside the transmission case 10, and three engagement clutches C1, C2, C3 for selecting a gear pair. A first shaft 11, a second shaft 12, a third shaft 13, a fourth shaft 14, a fifth shaft 15, and a sixth shaft 16 are provided as gear shafts. A first engagement clutch C1, a second engagement clutch C2, and a third engagement clutch C3 are provided as engagement clutches. The transmission case 10 is provided with an electric oil pump 20 that supplies lubrication oil to the meshing portions of the gears and the axle bearing portions inside the case.

The first shaft 11 is a shaft to which the internal combustion engine ICE is connected, and a first gear 101, a second gear 102, and a third gear 103 are disposed on the first shaft 11, in order from the right side in FIG. 1. The first gear 101 is integrally provided (including integral fixing) to the first shaft 11. The second gear 102 and the third gear 103 are idling gears, in which a boss portion protruding in the axial direction is inserted onto the outer perimeter of the first shaft 11, and are provided so as to be drivably connectable to the first shaft 11 via the second engagement clutch C2.

The second shaft 12 is connected to the first motor/generator MG1, and is a cylindrical shaft coaxially disposed with the axis aligned with the outer side position of the first shaft 11, and a fourth gear 104 and a fifth gear 105 are disposed on the second shaft 12, in order from the right side in FIG. 1. The fourth gear 104 and the fifth gear 105 are integrally provided (including integral fixing) to the second shaft 12.

The third shaft 13 is a shaft disposed on the output side of the multistage gear transmission 1, and a sixth gear 106, a seventh gear 107, an eighth gear 108, a ninth gear 109, and a tenth gear 110 are disposed on the third shaft 13, in order from the right side in FIG. 1. The sixth gear 106, the seventh gear 107, and the eighth gear 108 are integrally provided (including integral fixing) to the third shaft 13. The ninth gear 109 and the tenth gear 110 are idling gears, in which a boss portion protruding in the axial direction is inserted onto the outer perimeter of the third shaft 13, and are provided so as to be drivably connectable to the third shaft 13 via the third engagement clutch C3. Then, the sixth gear 106 meshes with the second gear 102 of the first shaft 11, the seventh gear 107 meshes with a sixteenth gear 116 of a differential gear 17, and the eighth gear 108 meshes with the third gear 103 of the first shaft 11. The ninth gear 109 meshes with the fourth gear 104 of the second shaft 12, and the tenth gear 110 meshes with the fifth gear 105 of the second shaft 12.

The fourth shaft 14 has both ends supported on the transmission case 10, with an eleventh gear 111, a twelfth gear 112, and a thirteenth gear 113 disposed on the fourth shaft 14, in order from the right side in FIG. 1. The eleventh gear 111 is integrally provided (including integral fixing) on the fourth shaft 14. The twelfth gear 112 and the thirteenth gear 113 are idling gears, in which a boss portion protruding in the axial direction is inserted onto the outer perimeter of the fourth shaft 14, and are provided so as to be drivably connectable to the fourth shaft 14 via the first engagement clutch C1. Then, the eleventh gear 111 meshes with the first gear 101 of the first shaft 11, the twelfth gear 112 meshes with a second gear 102 of the first shaft 11, and the thirteenth gear 113 meshes with the fourth gear 104 of the second shaft 12.

The fifth shaft 15 has both ends supported on the transmission case 10, and a fourteenth gear 114 that meshes with the eleventh gear 111 of the fourth shaft 14 is integrally provided thereto (including integral fixing).

The sixth shaft 16 is connected to the second motor/generator MG2, and a fifteenth gear 115 that meshes with the fourteenth gear 114 of the fifth shaft 15 is integrally provided thereto (including integral fixing).

The second motor/generator MG2 and the internal combustion engine ICE are mechanically connected to each other by a gear train configured from the fifteenth gear 115, the fourteenth gear 114, the eleventh gear 111, and the first gear 101, which mesh with each other. This gear train serves as a reduction gear train that decelerates the MG2 rotation speed at the time of an MG2 start of the internal combustion engine ICE by the second motor/generator MG2, and serves as a speed increasing gear train that accelerates the engine rotation speed at the time of MG2 power generation for generating the second motor/generator MG2, by the driving of the internal combustion engine ICE.

The first engagement clutch C1 is a dog clutch interposed between the twelfth gear 112 and the thirteenth gear 113 of the fourth shaft 14, and is engaged by an engagement movement in a rotation synchronization state, by not having a synchronization mechanism. When the first engagement clutch C1 is in a left engagement position (Left), the fourth shaft 14 and the thirteenth gear 113 are drivingly connected. When the first engagement clutch C1 is in a neutral position (N), the fourth shaft 14 and the twelfth gear 112 are released, and the fourth shaft 14 and the thirteenth gear 113 are released. When the first engagement clutch C1 is in a right engagement position (Right), the fourth shaft 14 and the twelfth gear 112 are drivingly connected.

The second engagement clutch C2 is a dog clutch interposed between the second gear 102 and the third gear 103 of the first shaft 11, and is engaged by an engagement movement in a rotation synchronization state by not having a synchronization mechanism. When the second engagement clutch C2 is in a left engagement position (Left), the first shaft 11 and the third gear 103 are drivingly connected. When the second engagement clutch C2 is in a neutral position (N), the first shaft 11 and the second gear 102 are released, and the first shaft 11 and the third gear 103 are released. When the second engagement clutch C2 is in a right engagement position (Right), the first shaft 11 and the second gear 102 are drivingly connected.

The third engagement clutch C3 is a dog clutch interposed between the ninth gear 109 and the tenth gear 110 of the third shaft 13, and is engaged by an engagement movement in a rotation synchronization state, by not having a synchronization mechanism. When the third engagement clutch C3 is in a left engagement position (Left), the third shaft 13 and the tenth gear 110 are drivingly connected. When the third engagement clutch C3 is in a neutral position (N), the third shaft 13 and the ninth gear 109 are released, and the third shaft 13 and the tenth gear 110 are released. When the third engagement clutch C3 is in a right engagement position (Right), the third shaft 13 and the ninth gear 109 are drivingly connected. Then, a sixteenth gear 116 that meshes with the seventh gear 107 integrally provided (including integral fixing) to the third shaft 13 of the multistage gear transmission 1 is connected to left and right drive wheels 19 via the differential gear 17 and left and right drive shafts 18.

The control system of the hybrid vehicle comprises a hybrid control module 21, a motor control unit 22, a transmission control unit 23, and an engine control unit 24, as illustrated in FIG. 1.

The hybrid control module 21 (acronym: "HCM") is an integrated control means to appropriately manage the energy consumption of the entire vehicle. This hybrid control module 21 is connected to the other control units (motor control unit 22, transmission control unit 23, engine control unit 24, etc.) so as to be capable of bidirectional information exchange by a CAN communication line 25. The "CAN" in CAN communication line 25 is an acronym for "Controller Area Network."

The motor control unit 22 (acronym: "MCU") carries out powering control, regeneration control, and the like, of the first motor/generator MG1 and the second motor/generator MG2, by control commands to the first inverter 4 and the second inverter 6. The control modes for the first motor/generator MG1 and the second motor/generator MG2 are "torque control" and "rotational speed FB control." In the "torque control," a control is carried out in which the actual motor torque is caused to follow a target motor torque, when a target motor torque to be shared with respect to a target drive force is determined. In the "rotational speed FB control," a control is carried out in which a target motor rotation speed, with which the input/output rotational speeds of the clutch are synchronized, is determined, and an FB torque is output so as to converge the actual motor rotation speed to the target motor rotation speed, when there is a gear shift request to mesh and engage any one of the engagement clutches C1, C2, C3 during traveling.

The transmission control unit 23 (acronym "TMCU") carries out a shift control for switching the gear shift pattern of the multistage gear transmission 1, by outputting a current command to electric actuators 31, 32, 33 (refer to FIG. 2), based on predetermined input information. In this shift control, the engagement clutches C1, C2, C3 are selectively mesh engaged/released, and a gear pair involved in power transmission is selected from the plurality of pairs of gear pairs. Here, at the time of a gear shift request to engage any one of the released engagement clutches C1, C2, C3, in order to suppress differential rotation speed between the input/output of the clutch to ensure meshing engagement, a rotational speed FB control (rotation synchronization control) of the first motor/generator MG1 or the second motor/generator MG2 is used in combination.

The engine control unit 24 (acronym: "ECU") carries out start control of the internal combustion engine ICE, stop control of the internal combustion engine ICE, fuel cut control, and the like, by outputting a control command to the motor control unit 22, a spark plug, a fuel injection actuator, or the like, based on predetermined input information.

Configuration of the Shift Control System

The multistage gear transmission 1 according to the embodiment is characterized in that efficiency is obtained by reducing drag by employing, as shifting elements, engagement clutches C1, C2, C3 (dog clutch) that are meshingly engaged. Then, when there is a gear shift request to mesh and engage any one of the engagement clutches C1, C2, C3, the differential rotation speeds of the input/output of the clutch are synchronized by the first motor/generator MG1 (when the engagement clutch C3 is engaged) or the second motor/generator MG2 (when the engagement clutches C1, C2 are engaged), and an engagement movement is started once the rotational speed falls within a synchronization determination rotational speed range, to realize the gear shift. In addition, when there is a gear shift request to release any one of the engaged engagement clutches C1, C2, C3, the clutch transmission torque of the release clutch is reduced, and a disengagement movement is started once the torque becomes equal to or less than a release torque determination value, to realize the gear shift. The configuration of the shift control system of the multistage gear transmission 1 is described below based on FIG. 2.

Figure 2:
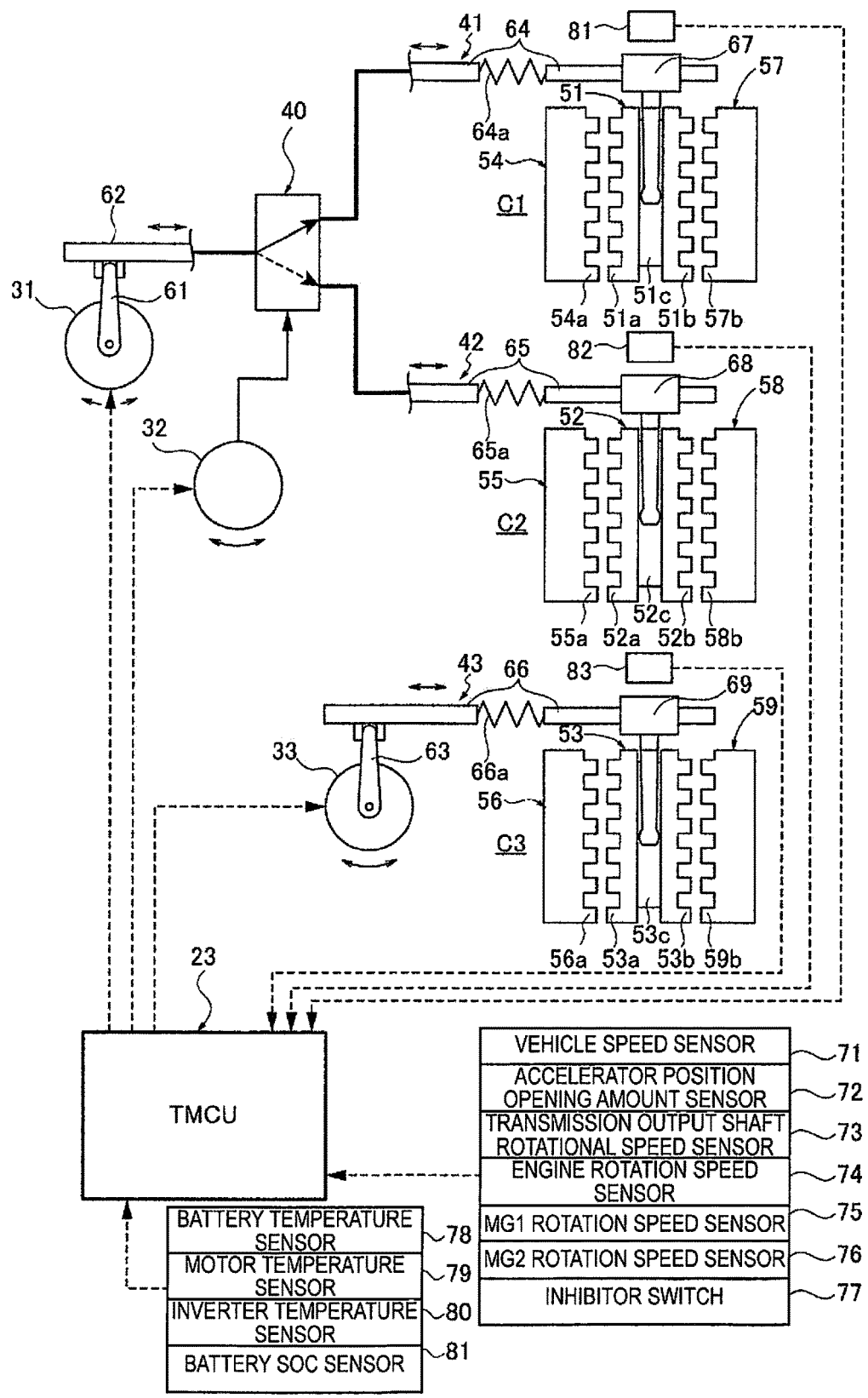
FIG. 2 is a control system block view illustrating the configuration of a shift control system of a multistage gear transmission mounted on a hybrid vehicle to which is applied the transmission control device of the first embodiment.

The shift control system comprises, as engagement clutches, a first engagement clutch C1, a second engagement clutch C2, and a third engagement clutch C3, as illustrated in FIG. 2. A first electric actuator 31 for C2, C3 shift operation, a second electric actuator 32 for C2, C3 select operation, and a third electric actuator 33 for C3 shift operation, are provided as actuators. A C1/C2 select operation mechanism 40, a C1 shift operation mechanism 41, a C2 shift operation mechanism 42, and a C3 shift operation mechanism 43 are provided as shift mechanisms that convert actuator operations into clutch engagement/disengagement operations. Furthermore, a transmission control unit 23 is provided as a control means of the first electric actuator 31, the second electric actuator 32, and the third electric actuator 33.

The first engagement clutch C1, the second engagement clutch C2, and the third engagement clutch C3 are dog clutches that switch between a neutral position (N: disengaged position), a left engagement position (Left: left side clutch meshing engagement position), and a right engagement position (Right: right side clutch meshing engagement position). The engagement clutches C1, C2, C3 all have the same configuration, comprising coupling sleeves 51, 52, 53, left dog clutch rings 54, 55, 56, and right dog clutch rings 57, 58, 59. The coupling sleeves 51, 52, 53 are provided so as to be movable in the axial direction by a spline connection via a hub, which is not shown, fixed to the fourth shaft 14, the first shaft 11, and the third shaft 13, and have dog teeth 51a, 51b, 52a, 52b, 53a, 53b on both sides having flat top faces. Furthermore, fork grooves 51c, 52c, 53c are provided in the circumferential center portions of the coupling sleeves 51, 52, 53. The left dog clutch rings 54, 55, 56 are fixed to the boss portions of the gears 113, 103, 110, which are left idling gears of the engagement clutches C1, C2, C3, and have dog teeth 54a, 55a, 56a with flat top faces that oppose the dog teeth 51a, 52a, 53a. The right dog clutch rings 57, 58, 59 are fixed to the boss portions of the gears 112, 102, 109, which are right idling gears of the engagement clutches C1, C2, C3, and have dog teeth 57b, 58b, 59b with flat top faces that oppose the dog teeth 51b, 52b, 53b.

The C1/C2 select operation mechanism 40 is a mechanism for selecting between a first position for selecting a connection between the first electric actuator 31 and the C1 shift operation mechanism 41, and a second position for selecting a connection between the first electric actuator 31 and the C2 shift operation mechanism 42. When selecting the first position, a shift rod 62 and a shift rod 64 of the first engagement clutch C1 are connected, and a shift rod 65 of the second engagement clutch C2 is locked in the neutral position. When selecting the second position, a shift rod 62 and the shift rod 65 of the second engagement clutch C2 are connected, and the shift rod 64 of the first engagement clutch C1 is locked in the neutral position. That is, the mechanism is such that, when selecting a position from among the first position and the second position where one of the engagement clutches is shifted, the other engagement clutch is locked and fixed in the neutral position.

The C1 shift operation mechanism 41, the C2 shift operation mechanism 42, and the C3 shift operation mechanism 43 are mechanisms for converting the turning motions of the electric actuators 31, 33 into axial movement of the coupling sleeves 51, 52, 53. The shift operating mechanisms 41, 42, 43 all have the same configuration, comprising turning links 61, 63, shift rods 62, 64, 65, 66, and shift forks 67, 68, 69. One end of each of the turning links 61, 63 are provided on the actuator shafts of the electric actuators 31, 33, with the other end connected to the one of the shift rods 64 (or shift rod 65), 66 so as to be relatively displaceable. The shift rods 64, 65, 66 are configured to be capable of expanding and contracting according to the magnitude and the direction of the rod transmitting force, by having springs 64a, 65a, 66a interposed in the rod dividing positions. One end each of the shift forks 67, 68, 69 is fixed to the shift rods 64, 65, 66, and the other end is disposed in one of the fork grooves 51c, 52c, 53c of the coupling sleeves 51, 52, 53.

The transmission control unit 23 inputs sensor signals and switch signals from a vehicle speed sensor 71, an accelerator position opening amount sensor 72, a transmission output shaft rotational speed sensor 73, an engine rotation speed sensor 74, an MG1 rotation speed sensor 75, an MG2 rotation speed sensor 76, an inhibitor switch 77, and the like. In addition, sensor signals from a battery temperature sensor 78, a motor temperature sensor 79, an inverter temperature sensor 80, a battery SOC sensor 81, and the like, are input. The transmission output shaft rotational speed sensor 73 is provided on the shaft end portion of the third shaft 13 and detects the shaft rotation speed of the third shaft 13. Then, a position servo control unit (for example a position servo system by PID control) is provided, which controls mesh engagement and disengagement of the engagement clutches C1, C2, and C3, determined by the positions of the coupling sleeves 51, 52, 53. This position servo control unit inputs sensor signals from a first sleeve position sensor 81, a second sleeve position sensor 82, and a third sleeve position sensor 83. Then, the sensor values of the sleeve position sensors 81, 82, 83 are read, and a current is imparted to the electric actuators 31, 32, and 33 such that the positions of the coupling sleeves 51, 52, and 53 will be in the disengaged position or the engagement position according to an engagement movement. That is, by setting an engaged state in which the dog teeth welded to the coupling sleeves 51, 52, and 53, and the dog teeth welded to the idling gears are both in engagement positions meshed with each other, the idling gears are drivingly connected to the fourth shaft 14, the first shaft 11, and the third shaft 13. On the other hand, by setting a disengaged state in which the dog teeth welded to the coupling sleeves 51, 52, and 53 and the dog teeth welded to the idling gears are in non-engagement positions by displacing the coupling sleeves 51, 52, and 53 in the axial direction, the idling gears are disconnected from the fourth shaft 14, the first shaft 11, and the third shaft 13.

Configuration of the Gear Shift Patterns

The multistage gear transmission 1 of the first embodiment is characterized in that size reduction is obtained by reducing the power transmission loss by not having a differential rotation absorbing element, such as a fluid coupling, and by reducing the gear shift stages of the ICE by providing motor assistance to the internal combustion engine ICE (EV gear shift stages: 1-2 speed, ICE gear shift stages: 1-4 speed). The configuration of the gear shift pattern of the multistage gear transmission 1 is described below based on FIG. 3 and FIG. 4.

Figure 3:
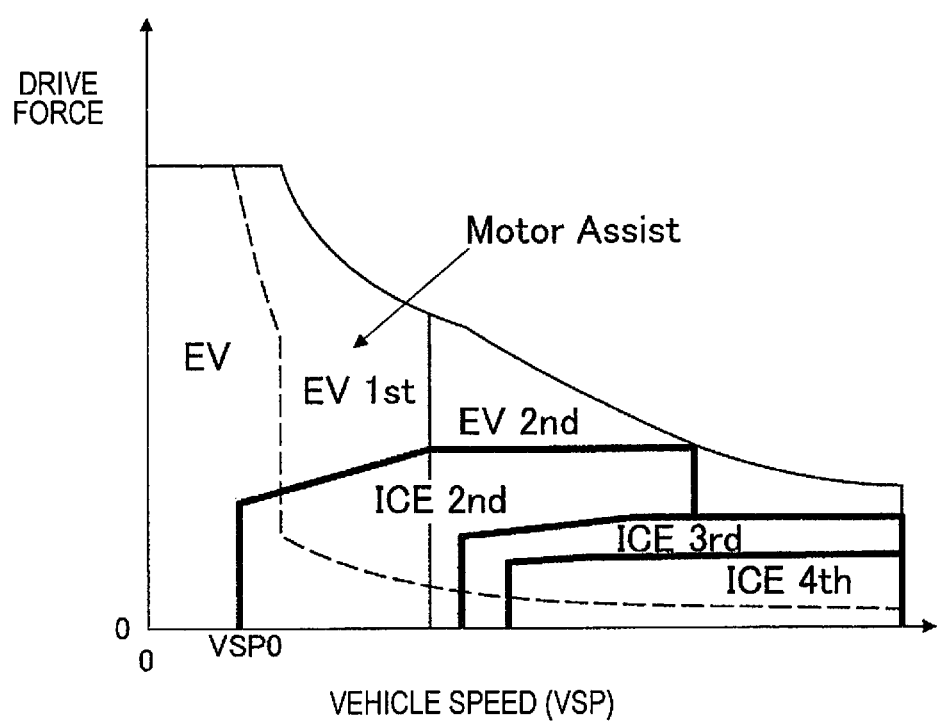
FIG. 3 is a schematic overview of a shifting map illustrating a concept of switching the gear shift pattern in a multistage gear transmission mounted on a hybrid vehicle to which is applied the transmission control device of the first embodiment.

A concept of the gear shift pattern is employed in which, when the vehicle speed VSP is in a starting region equal to, or less than, a predetermined vehicle speed VSP0, since the multistage gear transmission 1 does not have a starting element (slipping element), a motor start by only the motor driving force is carried out in the "EV mode," as illustrated in FIG. 3. Then, when in the traveling region and the demand for driving force is great, a "parallel HEV mode" is employed in which the engine driving force is assisted by the motor driving force, as illustrated in FIG. 3. That is, as the vehicle speed VSP increases, the ICE gear shift stages shift from (ICE 1st)→ICE 2nd→ICE 3rd→ICE 4th, and the EV gear shift stages shift from EV 1st→EV 2nd. Therefore, based on the concept of the gear shift pattern illustrated in FIG. 3, a shifting map for issuing gear shift requests for switching the gear shift stage is created.

All of the gear shift patterns obtainable by the multistage gear transmission 1 having engagement clutches C1, C2, C3 are as shown in FIG. 4. In FIG. 4, "Lock" represents an interlock pattern that is not applicable as a gear shift pattern, "EV-" represents a state in which the first motor/generator MG1 is not drivingly connected to the driving wheels 19, and "ICE-" represents a state in which the internal combustion engine ICE is not drivingly connected to the driving wheels 19. Each of the gear shift patterns is described below.

When the second engagement clutch C2 is "N" and the third engagement clutch C3 is "N," the following gear shift patterns are established according to the position of the first engagement clutch C1. "EV-ICEgen" is established if the first engagement clutch C1 is "Left," "Neutral" is established if the first engagement clutch C1 is "N," and "EV-ICE 3rd" is established if the first engagement clutch C1 is "Right." Here, the gear shift pattern "EV-ICEgen" is a pattern selected at the time of MG1 idle power generation, in which power is generated in the first motor/generator MG1 by the internal combustion engine ICE when the vehicle is stopped, or, at the time of double idle power generation in which MG2 power generation is carried out in addition to MG1 power generation. The gear shift pattern "Neutral" is a pattern selected at the time of MG2 idle power generation, in which power is generated in the second motor/generator MG2 by the internal combustion engine ICE when the vehicle is stopped.

When the second engagement clutch C2 is "N" and the third engagement clutch C3 is "Left," the following gear shift patterns are established according to the position of the first engagement clutch C1. "EV 1st ICE 1st" is established if the first engagement clutch C1 is "Left," "EV 1st ICE-" is established if the first engagement clutch C1 is "N," and "EV 1st ICE 3rd" is established if the first engagement clutch C1 is "Right." Here, the gear shift pattern "EV 1st ICE-" is an "EV mode" pattern in which the internal combustion engine ICE is stopped and traveling is carried out by the first motor/generator MG1, or, a "series HEV mode" pattern in which a first-speed EV traveling is carried out by the first motor/generator MG1 while power is generated in the second motor/generator MG2 by the internal combustion engine ICE.

When the second engagement clutch C2 is "Left" and the third engagement clutch C3 is "Left," "EV 1st ICE 2nd" is established if the position of the first engagement clutch C1 is "N." When the second engagement clutch C2 is "Left" and the third engagement clutch C3 is "N," the following gear shift patterns are established according to the position of the first engagement clutch C1. "EV 1.5 ICE 2nd" is established if the first engagement clutch C1 is "Left," and "EV-ICE 2nd" is established if the first engagement clutch C1 is "N." When the second engagement clutch C2 is "Left" and the third engagement clutch C3 is "Right," "EV 2nd ICE 2nd" is established if the position of the first engagement clutch C1 is "N."

When the second engagement clutch C2 is "N" and the third engagement clutch C3 is "Right," the following gear shift patterns are established according to the position of the first engagement clutch C1. "EV 2nd ICE 3rd" is established if the first engagement clutch C1 is "Left," "EV 2nd ICE-" is established if the first engagement clutch C1 is "N," and "EV 2nd ICE 3rd" is established if the first engagement clutch C1 is "Right." Here, the gear shift pattern "EV 2nd ICE-" an "EV mode" pattern in which the internal combustion engine ICE is stopped and traveling is carried out by the first motor/generator MG1, or, a "series HEV mode" pattern in which a second-speed EV traveling is carried out by the first motor/generator MG1 while power is generated in the second motor/generator MG2 by the internal combustion engine ICE.

When the second engagement clutch C2 is "Right" and the third engagement clutch C3 is "Right," "EV 2nd ICE 4th" is established if the position of the first engagement clutch C1 is "N." When the second engagement clutch C2 is "Right" and the third engagement clutch C3 is "N," the following gear shift patterns are established according to the position of the first engagement clutch C1. "EV 2.5 ICE 4th" is established if the first engagement clutch C1 is "Left," and "EV-ICE 4th" is established if the first engagement clutch C1 is "N." When the second engagement clutch C2 is "Right" and the third engagement clutch C3 is "Left," "EV 1st ICE 4th" is established if the position of the first engagement clutch C1 is "N."

Next, the method of dividing the plurality of gear shift stages described above into a "normal-use gear shift pattern group" and a "normally non-use gear shift pattern group" will be described.

First, the multistage gear transmission 1 comprises two EV gear shift stages (EV 1st, EV 2nd) that are gear shift stages of the first motor/generator MG1, a plurality of ICE gear shift stages (ICE 1st-ICE 4th) that are gear shift stages of the internal combustion engine ICE, and combination gear shift patterns of an EV gear shift stage and an ICE gear shift stage. Then, gear shift patterns excluding the interlock patterns (X mark in FIG. 4) and gear shift patterns that cannot be selected by the shift mechanism (hatching in FIG. 4) from all the gear shift patterns that can be established by engagement combinations of the engagement clutches C1, C2, C3, are considered as the plurality of gear shift patterns that can be established by the multistage gear transmission 1. Here, the gear shift patterns that cannot be selected by the shift mechanism are "EV 1.5 ICE 2nd" in which the first engagement clutch C1 is "Left" and the second engagement clutch C2 is "Left," and "EV 2.5 ICE 4th" in which the first engagement clutch C1 is "Left" and the second engagement clutch C2 is "Right." The reason why the shift mechanism is incapable of making a selection is that one first electric actuator 31 is a shift actuator that can be used by two engagement clutches C1, C2, and that one of the engagement clutches is neutral locked by the C1/C2 select operation mechanism 40.

Gear shift patterns in which one engagement clutch is present in a power transmission path leading from the power sources to the drive wheels 19 are selected from among a plurality of gear shift patterns that can be established by the multistage gear transmission 1, and the selected gear shift patterns are designated as the "normal-use gear shift pattern group," which is used for shift control under normal conditions. In the case of EV gear shift stages, the gear shift stages in which one engagement clutch is present in the power transmission path (EV 1st ICE-, EV 2nd ICE-) shall be the "normal-use gear shift pattern group." In the case of ICE gear shift stages, the gear shift stages in which one engagement clutch is present in the power transmission path (EV-ICE 2nd, EV-ICE 3rd, EV-ICE 4th) shall be the "normal-use gear shift pattern group." In the case of combination gear shift stages, the gear shift stages in which one engagement clutch is present in the power transmission path of the EV gear shift stage and one engagement clutch is present in the power transmission path of the ICE gear shift stage (EV 1st ICE 2nd, EV 1st ICE 3rd, EV 1st ICE 4th, EV 2nd ICE 2nd, EV 2nd, ICE 3rd, EV 2nd ICE 4th) shall be the "normal-use gear shift pattern group." The "normal-use gear shift pattern group" is configured from a total of 13 gear shift stages, established by adding "EV-ICEgen" and "Neutral" to the 11 gear shift stages described above.

Gear shift patterns in which two or more engagement clutches are present in the power transmission path are selected from among a plurality of gear shift patterns that can be established by the multistage gear transmission 1, and the selected gear shift stages are designated as the "normally non-use gear shift pattern group," which is not used for shift control under normal conditions. In the case of combination gear shift patterns of an EV gear shift stage and an ICE gear shift stage, the gear shift patterns in which one engagement clutch is present in the power transmission path of the EV gear shift stage and two engagement clutches are present in the power transmission path of the ICE gear shift stage (EV 1st ICE 1st, EV 2nd ICE 3rd') shall be the "normally non-use gear shift pattern group." As described in the following Configuration of the shift control process, the gear shift patterns of the "normally non-use gear shift pattern group" are normally not used, but are used, or are permitted to be used, when predetermined conditions outside of normal conditions are satisfied.

Configuration of the Shift Control Process

Figure 5:
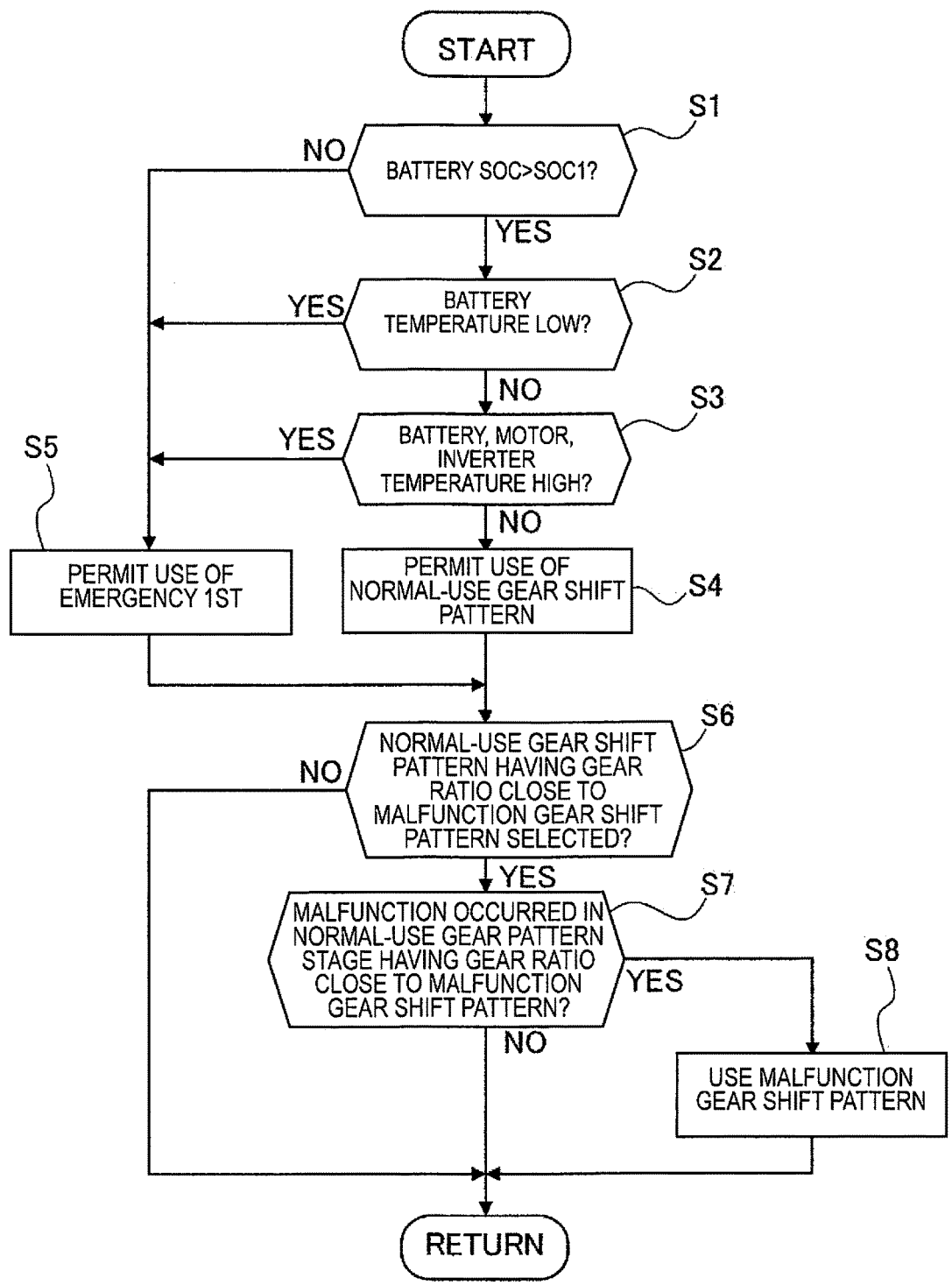
FIG. 5 is a flowchart illustrating the flow of a shift control process carried out in a transmission control unit of the first embodiment.

FIG. 5 illustrates the flow of a shift control process carried out in the transmission control unit 23 (transmission controller) of the first embodiment. Each of the steps that represent the shift control process configuration will be described below.

In Step S1, it is determined whether or not the battery charge capacity (hereinafter referred to as "battery SOC") has exceeded a predetermined capacity SOC1. In the case of YES (battery SOC>SOC1), the process proceeds to Step S2, and if NO (battery SOC≤SOC1), the process proceeds to Step S5. Here, "battery SOC" is acquired by a battery SOC sensor 81, which detects the charge capacity of the high-power battery 3. The "predetermined capacity SOC1" is set as a switching threshold between a first shift schedule map (FIG. 6) for setting a normal charge/discharge transmission control mode, and a second shift schedule map (FIG. 12) for setting a charging-oriented transmission control mode, when carrying out energy management by monitoring the battery SOC. Then, when the battery SOC is equal to or less than the predetermined capacity SOC1, and a battery low capacity condition indicating that the battery SOC is insufficient has been established, the process proceeds to Step S5.

In Step S2, following the determination that battery SOC>SOC1 in Step S1, it is determined whether or not the battery temperature is low. In the case of YES (battery temperature low), the process proceeds to Step S5, and if NO (battery temperature not low), the process proceeds to Step S3. Here, "battery temperature" is acquired by a battery temperature sensor 78, which detects the battery temperature of the high-power battery 3. Then, if the temperature of the high-power battery 3 decreases, and a battery low temperature condition is established, where the temperature is equal to or less than a first temperature threshold at which a predetermined output cannot be output, it is determined that the battery temperature is low.

In Step S2, following the determination that the battery temperature is not low in Step S2, it is determined whether or not the battery temperature, the motor temperature, and the inverter temperature are high. In the case of YES (temperature of the first motor/generator system is high), the process proceeds to Step S5, and if NO (temperature of the first motor/generator system is not high), the process proceeds to Step S4. Here, "battery temperature" is acquired by the battery temperature sensor 78, and "motor temperature" is acquired by a motor temperature sensor 79, which detects the temperature of the first motor/generator MG1. The "inverter temperature" is acquired by an inverter temperature sensor 80, which detects the temperature of the first inverter 4. Then, if the temperature of the first motor/generator system, from the high-power battery 3 to the first motor/generator MG1, is increased and a first motor/generator system high temperature condition is established, where the temperature is equal to or greater than a second temperature threshold at which a predetermined output cannot be output, it is determined that the temperature of the first motor/generator system is high.

Figure 6:
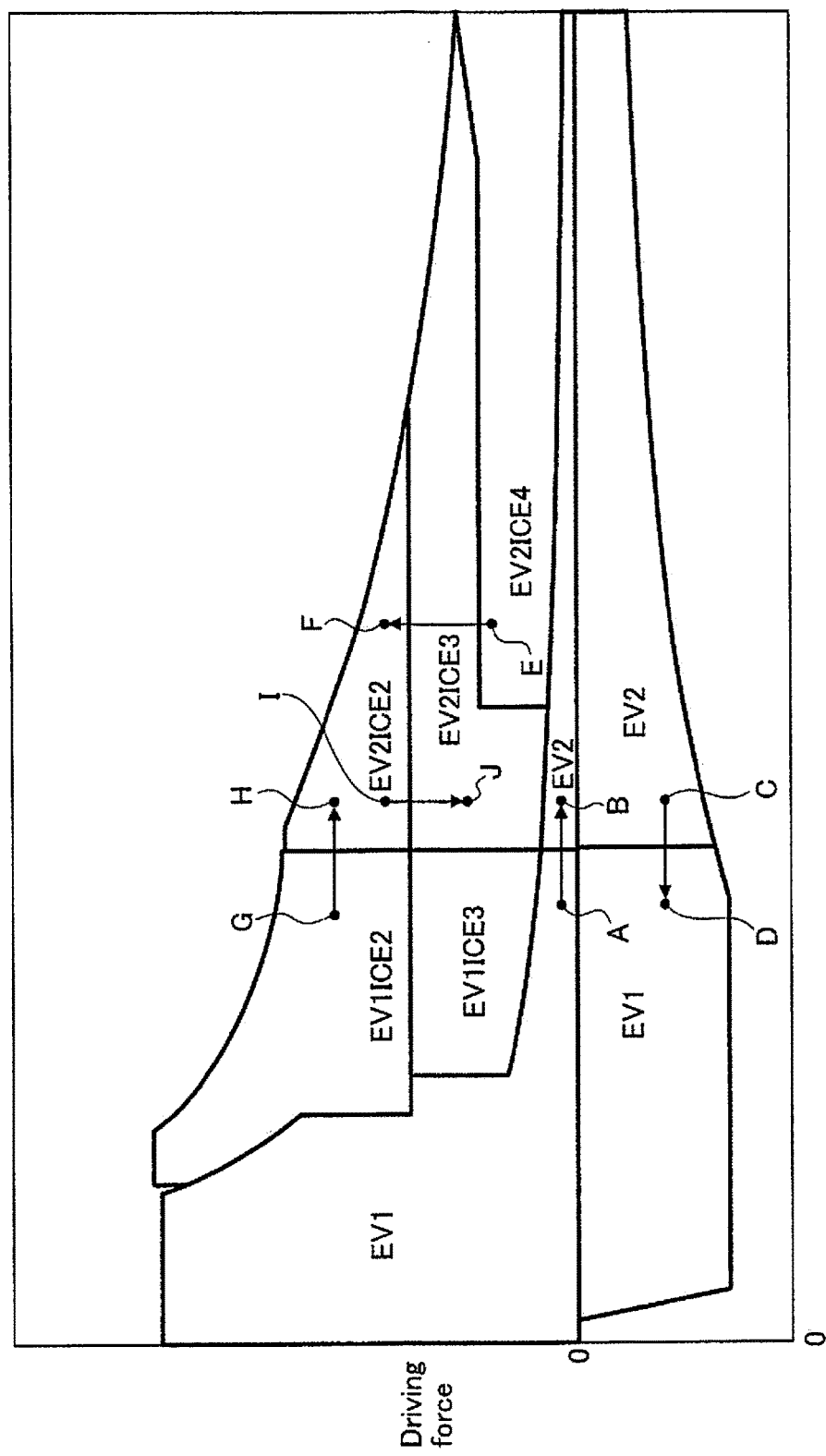
FIG. 6 is a first shift schedule map illustrating the shift schedule that is selected when the battery SOC is in a normal capacity region (normal-use gear shift stage).

In Step S4, following the determination that the temperature of the first motor/generator system is not high in Step S3, the use of the normal-use gear shift patterns is permitted, shift control using the first shift schedule map illustrated in FIG. 6 is carried out, and the process proceeds to Step S6.

Here, a shift control using the first shift schedule map refers to a control for selecting a normal-use gear shift pattern that is assigned to the position of an operating point that is present on the first shift schedule map illustrated in FIG. 6. Therefore, if the normal-use gear shift pattern that is to be selected is changed by a movement of the operating point, the gear shift stage is changed by an upshift or a downshift.

Figure 12:
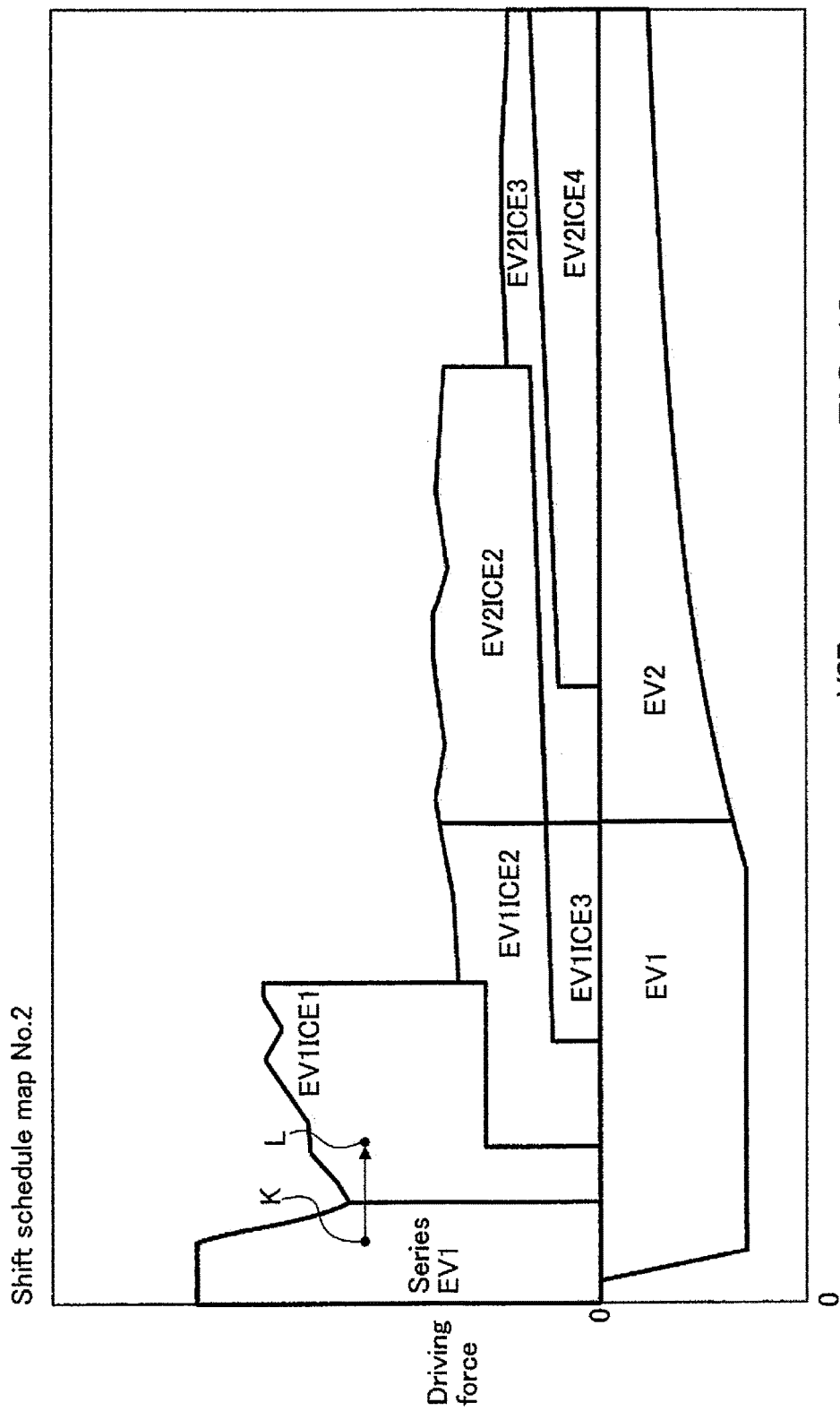
FIG. 12 is a second shift schedule map illustrating the shift schedule that is selected when the battery SOC is in a low capacity region (normal use gear shift pattern+EV 1st ICE 1st).

In Step S5, following the determination that the battery SOC is low in Step S1, the determination that the battery temperature is low in Step S2, or the determination that the temperature of the first motor/generator system is high in Step S3, the use of gear shift patterns established by adding emergency 1st ("EV 1st ICE 1st"), which is a normally non-use gear shift pattern, to the normal-use gear shift patterns is permitted, shift control using the second shift schedule map illustrated in FIG. 12 is carried out, and the process proceeds to Step S6. Here, in the shift control using the second shift schedule map, the gear shift patterns are different from the gear shift patterns that can be used in the shift control using the first shift schedule map (FIG. 6), in that "EV 1st" is changed to "Series EV 1st", and also in that an emergency 1st gear shift pattern of "EV 1st ICE 1st" is added.

In Step S6, following the permission to use a normal use gear shift pattern in Step S4, or the permission to use an emergency $1^{st}$ gear shift pattern in Step S5, it is determined whether or not a normal-use gear shift pattern having a gear ratio close to the malfunction gear shift pattern is selected. In the case of YES (when "EV 2nd ICE 3rd" is selected), the process proceeds to Step S7, and if NO (when other than "EV 2nd ICE 3rd" is selected), the process proceeds to RETURN. Here, "malfunction gear shift pattern" refers to "EV 2nd ICE 3rd'," and the normal-use gear shift pattern having a gear ratio close to the malfunction gear shift pattern refers to "EV 2nd ICE 3rd."

In Step S7, following the determination that "EV 2nd ICE 3rd" is selected in Step S6, it is determined whether or not a malfunction has occurred in a normal-use gear shift pattern that has a gear ratio close to the malfunction gear shift pattern. In the case of YES (malfunction has occurred), the process proceeds to Step S8, and if NO (malfunction has not occurred), the process proceeds to RETURN. Here, a malfunction in the normal-use gear shift pattern "EV 2nd ICE 3rd" refers to, for example, a malfunction in which a mechanical or electric problem occurs in the shift operation system, which causes the first engagement clutch C1 to move to the "Right," such that "EV 2nd ICE 3rd" cannot be selected.

In Step S8, following the determination that a malfunction has occurred in Step S7, of the gear shift patterns that are present in the normally non-use gear shift pattern group, a gear shift pattern with a gear ratio close to the gear shift pattern in which the malfunction has occurred is used as a malfunction gear shift pattern ("EV 2nd ICE 3rd'" gear shift pattern), and the process proceeds to RETURN. Here, "used as a malfunction gear shift pattern" refers to using the gear shift pattern of "EV 2nd ICE 3rd'" instead of "EV 2nd ICE 3rd" during a shift control using the first or second shift schedule map.

Next, the actions are described. The "action of the shift control process," the "action of the shift control under normal conditions," the "action of the shift control by a permission to use emergency 1st," the "action of the shift control during failure," and the "characteristic action of the shift control," will be separately described, regarding the actions of the transmission control device for a hybrid vehicle according to the first embodiment.

Action of the Shift Control Process

The action of the shift control process in each traveling scenario will be described below, based on the flowchart illustrated in FIG. 5.

It is assumed that it has been determined that the battery SOC has exceeded the predetermined capacity SOC1 in Step S1, that the battery temperature is not low in Step S2, and that the temperature of the first motor/generator system is not high in Step S3. At this time, the process proceeds from Step S1→Step S2→Step S3→Step S4 in the flowchart of FIG. 5. In Step S4, the use of the normal-use gear shift patterns is permitted, and a shift control using the first shift schedule map illustrated in FIG. 6 is carried out.

On the other hand, if it is determined that the battery SOC is equal to or less than the predetermined capacity SOC1 in Step S1, the process proceeds from Step S1 to Step S5 in the flowchart of FIG. 5. Even if it is determined that the battery SOC has exceeded the predetermined capacity SOC1 in Step S1, if it is determined that the battery temperature is low in Step S2, the process proceeds from Step S1→Step S2→Step S5 in the flowchart of FIG. 5. Even if it is determined that the battery SOC has exceeded the predetermined capacity SOC1 in Step S1, and it is determined that the battery temperature is not low in Step S2, if it is determined that the temperature of the first motor/generator system is high in Step S3, the process proceeds from Step S1→Step S2→Step S3→Step S5 in the flowchart of FIG. 5. In Step S5, the use of gear shift patterns established by adding emergency 1st ("EV 1st ICE 1st"), which is a normally non-use gear shift pattern, to the normal-use gear shift patterns is permitted, and shift control using the second shift schedule map illustrated in FIG. 12 is carried out.

When proceeding from Step S4 or Step S5 to Step S6, in a traveling scenario in which a gear shift pattern other than "EV 2nd ICE 3rd" is selected in Step S6, the process proceeds from Step S6 to RETURN in the flowchart of FIG. 5. In addition, in a traveling scenario in which "EV 2nd ICE 3rd" is selected in Step S6 but a malfunction has not occurred in a normal-use gear shift pattern having a gear ratio close to the malfunction gear shift pattern in Step S7, the process proceeds from Step S6 to Step S7→RETURN in the flowchart of FIG. 5.

On the other hand, in a traveling scenario in which "EV 2nd ICE 3rd" is selected in Step S6, and it is determined that a malfunction has occurred in a normal-use gear shift pattern having a gear ratio close to the malfunction gear shift pattern in Step S7, the process proceeds from Step S6 to Step S7→Step S8→RETURN in the flowchart of FIG. 5. In Step S8, of the gear shift patterns that are present in the normally non-use gear shift pattern group, the "EV 2nd ICE 3rd'" gear shift pattern with a gear ratio close to the gear shift pattern in which the malfunction has occurred is used as a malfunction gear shift pattern. That is, the shift control is switched to a shift control in which the gear shift stage of "EV 2nd ICE 3rd'" is used instead of "EV 2nd ICE 3rd" during a shift control using the first or second shift schedule map.

Action of the Shift Control Under Normal Conditions

When proceeding to Step S4 in the flowchart of FIG. 5, a shift control under normal conditions using the first shift schedule map is carried out, based on the permission to use a normal-use gear shift pattern. The action of the shift control under normal conditions will be described below based on FIGS. 6 to 11.

The "first shift schedule map" used in the shift control under normal conditions is a map in which the vehicle speed VSP and the required driving force (Driving force) are the coordinate axes, and on the coordinate plane of which is assigned a selection region for selecting a plurality of gear shift patterns that constitute the normal-use gear shift pattern group, as illustrated in FIG. 6. That is, selection regions of "EV 1st," "EV 1st ICE 2nd," and "EV 1st ICE 3rd" are assigned to the low vehicle speed region after start, as a powering driving region by an accelerator depression. Then, the selection regions of "EV 2nd," "EV 2nd ICE 2nd," "EV 2nd ICE 3rd," and "EV 2nd ICE 4th" are assigned to the high vehicle speed region. As regenerative braking regions by a braking deceleration with the foot off the accelerator, the selection region of "EV 1st" is assigned to the low vehicle speed region, and the selection region of "EV 2nd" is assigned to the high vehicle speed region.

In the case of "EV 1st" and "EV 2nd" of the powering driving region, a third engagement clutch C3 (Left and Right) is present on the power transmission path leading from the first motor/generator MG1 to the drive wheels 19. In the case of "EV 1st" and "EV 2nd" of the regenerative braking region, a third engagement clutch C3 (Left and Right) is present on the power transmission path leading from the drive wheels 19 to the first motor/generator MG1.

Figure 7:
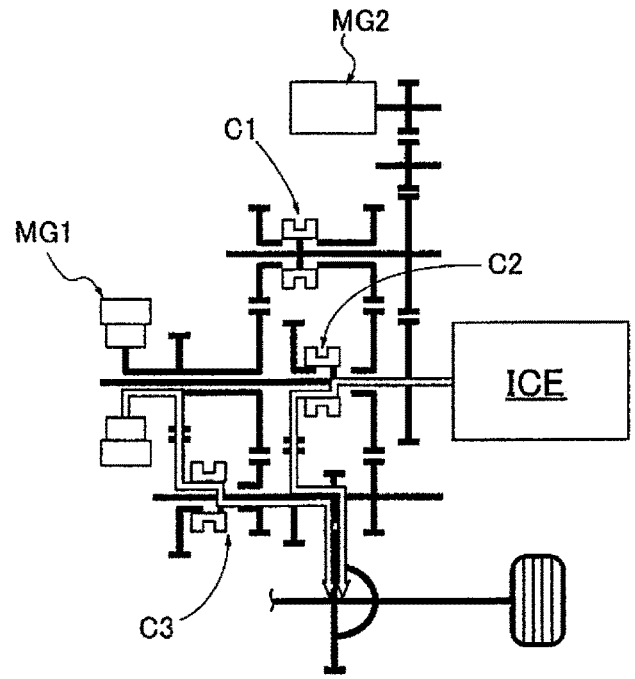
FIG. 7 is a torque flow view illustrating the transmission path of the MG1 torque and the ICE torque in the multistage gear transmission, when the normal-use gear shift pattern (EV 1st, ICE 2nd) is selected.

In the case of the normal-use gear shift pattern "EV 1st ICE 2nd," a third engagement clutch C3 (Left) is present on the power transmission path leading from the first motor/generator MG1 to the drive wheels 19, as illustrated in FIG. 7. Then, a second engagement clutch C2 (Left) is present on the power transmission path leading from the internal combustion engine ICE to the drive wheels 19.

Figure 8:
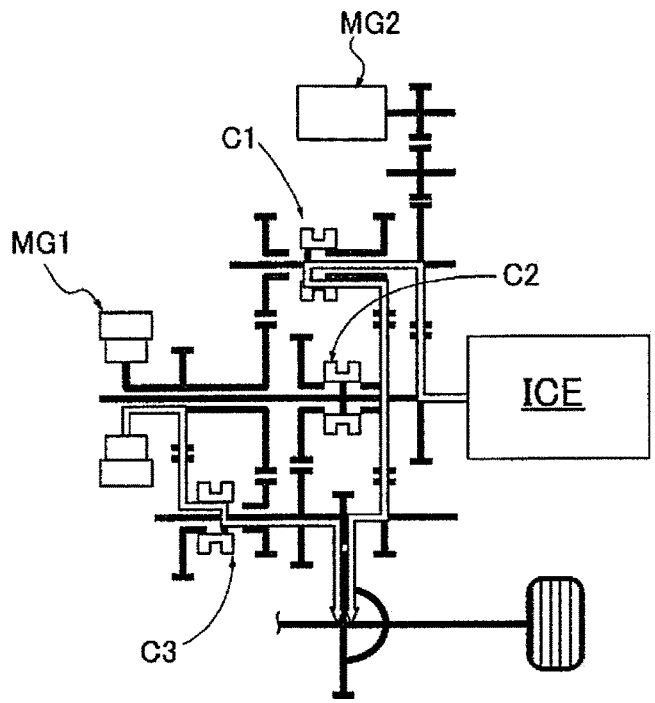
FIG. 8 is a torque flow view illustrating the transmission path of the MG1 torque and the ICE torque in the multistage gear transmission, when the normal-use gear shift pattern (EV 1st, ICE 3rd) is selected.

In the case of the normal-use gear shift pattern "EV 1 st ICE 3rd," a third engagement clutch C3 (Left) is present on the power transmission path leading from the first motor/generator MG1 to the drive wheels 19, as illustrated in FIG. 8. Then, s first engagement clutch C1 (Right) is present on the power transmission path leading from the internal combustion engine ICE to the drive wheels 19.

Figure 9:
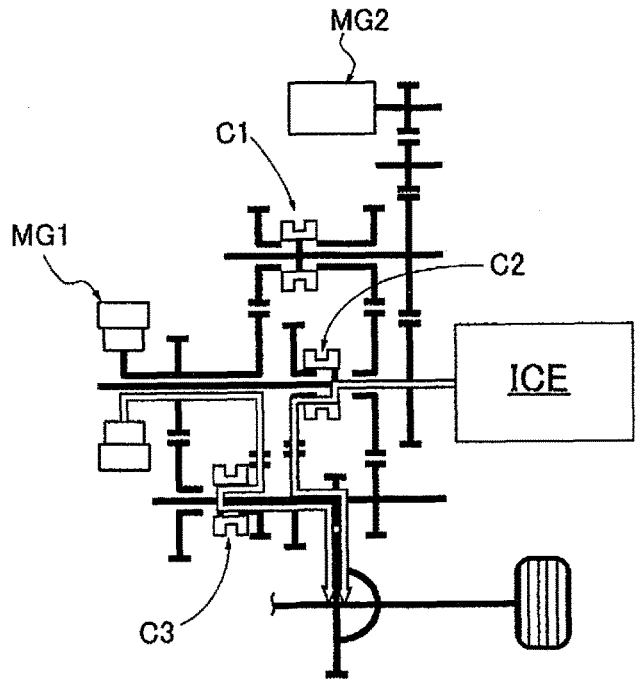
FIG. 9 is a torque flow view illustrating the transmission path of the MG1 torque and the ICE torque in the multistage gear transmission, when the normal-use gear shift pattern (EV 2nd, ICE 2nd) is selected.

In the case of the normal-use gear shift pattern "EV 2nd ICE 2nd," s third engagement clutch C3 (Right) is present on the power transmission path leading from the first motor/generator MG1 to the drive wheels 19, as illustrated in FIG. 9. Then, s second engagement clutch C2 (Left) is present on the power transmission path leading from the internal combustion engine ICE to the drive wheels 19.

Figure 10:
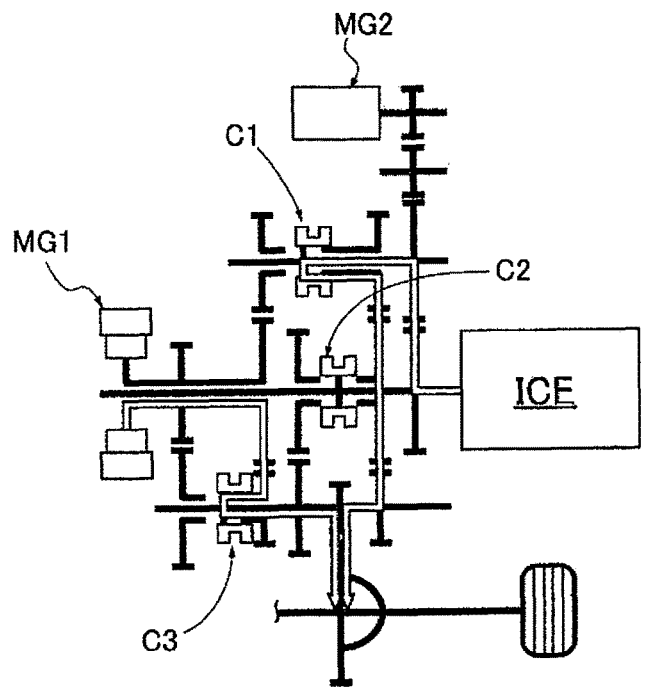
FIG. 10 is a torque flow view illustrating the transmission path of the MG1 torque and the ICE torque in the multistage gear transmission, when the normal-use gear shift pattern (EV 2nd, ICE 3rd) is selected.

In the case of the normal-use gear shift pattern "EV 2nd ICE 3rd," a third engagement clutch C3 (Right) is present on the power transmission path leading from the first motor/generator MG1 to the drive wheels 19, as illustrated in FIG. 10. Then, s first engagement clutch C1 (Right) is present on the power transmission path leading from the internal combustion engine ICE to the drive wheels 19.

Figure 11:
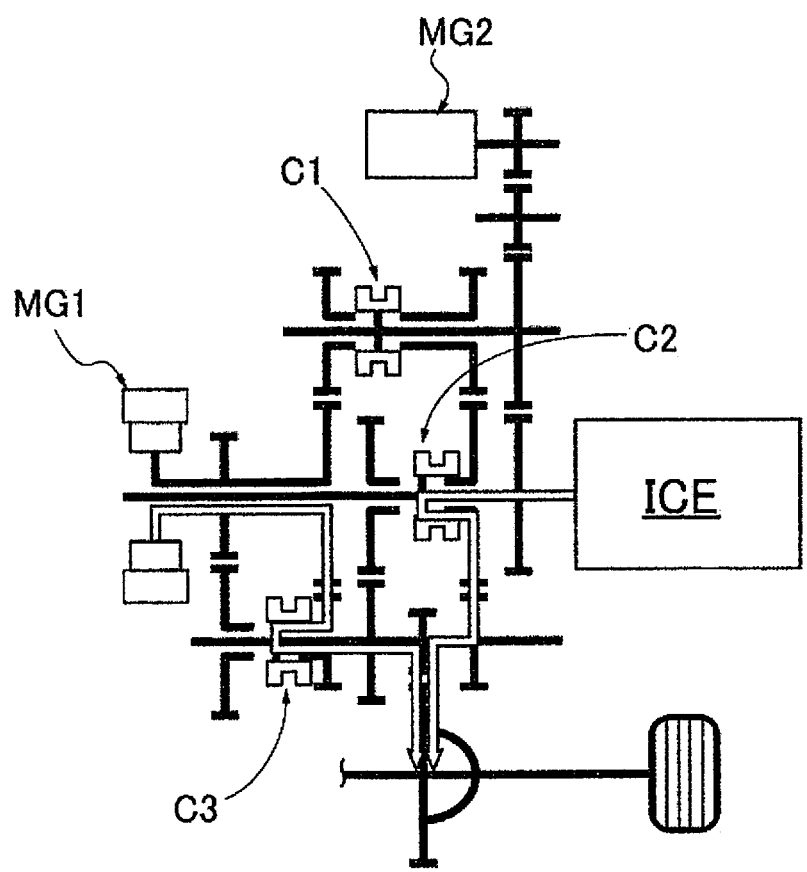
FIG. 11 is a torque flow view illustrating the transmission path of the MG1 torque and the ICE torque in the multistage gear transmission, when the normal-use gear shift pattern (EV 2nd, ICE 4th) is selected.

In the case of the normal-use gear shift pattern "EV 2nd ICE 4th," a third engagement clutch C3 (Right) is present on the power transmission path leading from the first motor/generator MG1 to the drive wheels 19, as illustrated in FIG. 11. Then, a second engagement clutch C2 (Right) is present on the power transmission path leading from the internal combustion engine ICE to the drive wheels 19.

Therefore, for example, if the vehicle speed VSP increases from operating point A to operating point B in FIG. 6, an upshift to switch the gear shift pattern from "EV 1st" to "EV 2nd" is executed. This upshift is established by causing the coupling sleeve 53 of the third engagement clutch C3 to move from the "Left" engagement position to the "Right" engagement position via the "N" position. At this time, the first engagement clutch C1 and the second engagement clutch C2 are kept in the "N" position.

For example, if the vehicle speed VSP decreases from operating point C to operating point D in FIG. 6, a downshift to switch the gear shift pattern from "EV 2nd" to "EV 1st" is executed. This downshift is established by causing the coupling sleeve 53 of the third engagement clutch C3 to move from the "Right" engagement position to the "Left" engagement position via the "N" position. At this time, the first engagement clutch C1 and the second engagement clutch C2 are kept in the "N" position.

For example, when traveling in the "parallel HEV mode" while selecting the "EV 2nd ICE 4th" gear shift pattern, when moving from operating point E to operating point F in FIG. 6 by an accelerator depression operation, a downshift request is issued. When the second engagement clutch C2 is switched from "Right" to "Left" via "N" according to this downshift request, the vehicle transitions to traveling by the "parallel HEV mode" by the "EV 2nd ICE 2nd" gear shift pattern, in which the ICE gear shift stage is put in second speed.

For example, when traveling in the "parallel HEV mode" while selecting the "EV 2nd ICE 2nd" gear shift pattern, when moving from operating point G to operating point H in FIG. 6 due to an increase in the vehicle speed VSP, an upshift request is issued. When the third engagement clutch C3 is switched from "Left" to "Right" via "N" according to this upshift request, the vehicle transitions to traveling by the "parallel HEV mode" by the "EV 2nd ICE 2nd" gear shift pattern, in which the ICE gear shift stage is put in second speed.

For example, when traveling in the "parallel HEV mode" while selecting the "EV 2nd ICE 2nd" gear shift pattern, when moving from operating point I to operating point J in FIG. 6 by an accelerator returning operation, an upshift request is issued. When the second engagement clutch C2 is switched from "Left" to "Right" via "N" according to this upshift request, the vehicle transitions to traveling by the "parallel HEV mode" by the "EV 2nd ICE 3rd" gear shift pattern, in which the ICE gear shift stage is put in third speed.

Action of the Shift Control by a Permission to Use Emergency 1 st

When proceeding to Step S5 in the flowchart of FIG. 5, a shift control using the second shift schedule map is executed, based on a permission to use a gear shift pattern established by adding "EV 1st ICE 1st," which is the emergency 1st, to a normal-use gear shift pattern. The action of the shift control by a permission to use emergency 1st will be described below, based on FIG. 12 and FIG. 13.

The "second shift schedule map" used in the shift control by a permission to use emergency 1st is a map in which the vehicle speed VSP and the required driving force (Driving force) are the coordinate axes, and on the coordinate plane of which is assigned a selection region for selecting a gear shift stage established by adding "EV 1st ICE 1st" to a normal-use gear shift pattern, as illustrated in FIG. 12. That is, a selection region of "Series EV 1st" is assigned to the low vehicle speed region after start, as a powering driving region by an accelerator depression. Then, the selection regions of "EV 1st ICE 1st," "EV 1st ICE 2nd," and "EV 1st ICE 3rd" are assigned to the intermediate vehicle speed region, and the selection regions of "EV 2nd ICE 2nd," "EV 2nd ICE 3rd," and "EV 2nd ICE 4th" are assigned to the high vehicle speed region. As regenerative braking regions by a braking deceleration with the foot off the accelerator, the selection region of "EV st" is assigned to the low vehicle speed region, and the selection region of "EV 2nd" is assigned to the high vehicle speed region.

In the case of "Series EV 1st" of the powering driving region, a third engagement clutch C3 (Left) is present on the power transmission path leading from the first motor/generator MG1 to the drive wheels 19. In the case of "EV 1st" and "EV 2nd" of the regenerative braking region, a third engagement clutch C3 (Left and Right) is present on the power transmission path leading from the drive wheels 19 to the first motor/generator MG1.

Figure 13:
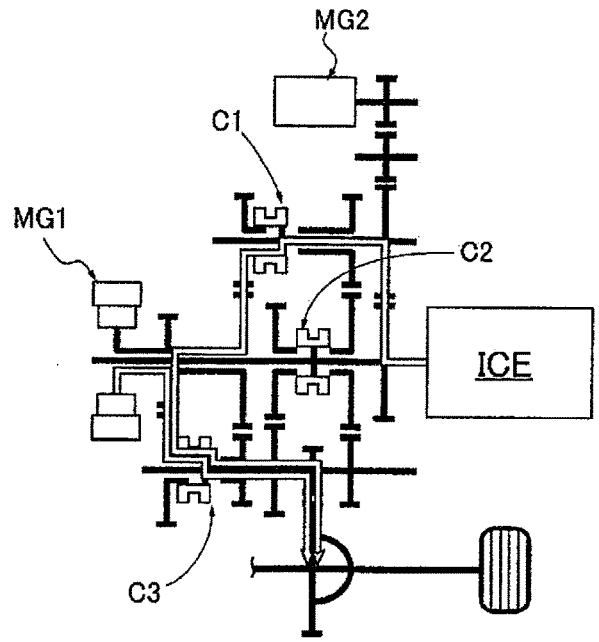
FIG. 13 is a torque flow view illustrating the transmission path of the MG1 torque and the ICE torque in the multistage gear transmission, when the normally non-use gear shift pattern (EV 1st, ICE 1st: emergency 1st) is selected.

In the case that "EV 1st ICE 1st" of emergency 1st, which is a normally non-use gear shift pattern, is selected, a third engagement clutch C3 (Left) is present on the power transmission path leading from the first motor/generator MG1 to the drive wheels 19, as illustrated in FIG. 13. Then, two engagement clutches by the first engagement clutch C1 (Left) and the third engagement clutch C3 (Left) are present on the power transmission path leading from the internal combustion engine ICE to the drive wheels 19.

Therefore, at the time of start, the gear shift stage of "Series EV 1st" is selected, and the vehicle is started in the "series HEV mode," while generating electric power with the second motor/generator MG2 by the driving force of the internal combustion engine ICE. While traveling in the "series HEV mode" after this start, for example, when moving from operating point K to operating point L in FIG. 12 due to an increase in the vehicle speed VSP, a shift request to emergency 1st is issued. When the first engagement clutch C1 is switched from "N" to "Left" according to this shift request to emergency 1st, the vehicle transitions to traveling by the "parallel HEV mode" by the "EV 1st ICE 1st" gear shift pattern, in which the EV gear shift stage is put in first speed and the ICE gear shift stage is put in first speed. That is, in the shift control by a permission to use emergency 1st, the battery SOC of the high-power battery 3 is increased by generating electric power in the second motor/generator MG2 in the starting region. Then, by transitioning to the "EV 1st ICE 1st" gear shift pattern, which is the emergency 1st, in the low-speed region, the required vehicle driving force is mainly covered for by the internal combustion engine ICE, and the battery SOC consumption of the high-power battery 3 by the first motor/generator MG1 is suppressed. As a result, in terms of the battery budget, the battery SOC of the high-power battery 3, which is decreasing, is increased.

Action of the Shift Control During Failure

Next, when proceeding to Step S8 in the flowchart of FIG. 5, a shift control during failure using the first or the second shift schedule map is carried out, based on the use of the malfunction gear shift pattern ("EV 2nd ICE 3rd'"). The action of the shift control during failure will be described below based on FIG. 14.

Figure 14:
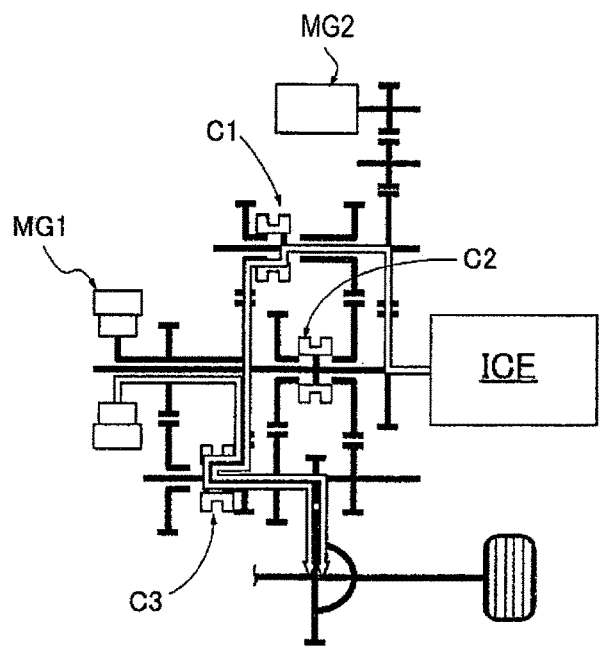
FIG. 14 is a torque flow view illustrating the transmission path of the MG1 torque and the ICE torque in the multistage gear transmission, when the normal-use gear shift pattern (EV 2nd, ICE 3rd': malfunction gear shift pattern) is selected.

In the case that the normally non-use gear shift pattern "EV 2nd ICE 3rd'" is selected, a third engagement clutch C3 (Right) is present on the power transmission path leading from the first motor/generator MG1 to the drive wheels 19, as illustrated in FIG. 14. Then, two engagement clutches by the first engagement clutch C1 (Left) and the third engagement clutch C3 (Right) are present on the power transmission path leading from the internal combustion engine ICE to the drive wheels 19.

Therefore, in the shift control during failure, when selecting the "EV 2nd ICE 3rd" gear shift stage during a shift control using the first or the second shift schedule map, a shift control is carried out to select, instead of the "EV 2nd ICE 3rd" gear pattern, the "EV 2nd ICE 3rd'" gear shift pattern, which has a similar gear ratio. That is, in a failure mode such as when the "EV 2nd ICE 3rd" gear shift pattern cannot be selected, a shift control using the first or the second shift schedule map is continued as is, by using "EV 2nd ICE 3rd'" as a backup gear shift pattern.

Characteristic Action of the Shift Control

In the first embodiment, gear shift patterns in which one engagement clutch is present in a power transmission path leading from the first motor/generator MG1 or the internal combustion engine ICE to the drive wheels 19 are selected from among a plurality of gear shift pattern that can be established by the multistage gear transmission 1. Then, the selected plurality of gear shift patterns are designated as the "normal-use gear shift pattern group," which is used for shift control under normal conditions. That is, gear shift patterns that are selected as the "normal-use gear shift pattern group" have only one engagement clutch in the power transmission path, from among the three engagement clutches C1, C2, C3. Accordingly, excellent gear shifting quality is obtained, whereby it is possible to suppress backlash shock and noise unique to cases in which meshing engagement clutches C1, C2, C3 are used as shifting elements when shifting gears under normal conditions. Since a normal-use gear shift pattern is a pattern in which shock and noise are suppressed, it is not necessary to take measures against vibration to moderate the gradient of torque increase and decrease during shifting, and it is possible to secure a high gear shift responsiveness, in which the time required for shifting is short. As a result, when there is a gear shift request, gear shift responsiveness corresponding to a driver's request is ensured, while achieving excellent gear shifting quality when shifting gears in normal conditions.

In the first embodiment, gear shift patterns (EV 1st ICE 1st, EV 2nd ICE 3rd') in which two or more engagement clutches C1, C2, C3 are present in the power transmission path are selected from among a plurality of gear shift patterns that can be established by the multistage gear transmission 1. The selected gear shift patterns are designated as the normally non-use gear shift pattern group, which is not used for shift control under normal conditions, and when a predetermined condition is established, the use of a gear shift pattern (EV 1st ICE 1st, EV 2nd ICE 3rd') of the normally non-use gear shift pattern group is permitted. That is, the gear shift patterns of the normally non-use gear shift pattern group have two or more engagement clutches in the power transmission path, from among the three engagement clutches C1, C2, C3, and can be used as a gear shift pattern, although an excellent gear shifting quality cannot be obtained. Therefore, when a predetermined condition is satisfied, by permitting the use of a gear shift pattern of the normally non-use gear shift pattern group, a normally non-use gear shift pattern is effectively used as a backup gear shift pattern of a normal-use gear shift pattern.

In the first embodiment, when a battery low capacity condition is established, in which the battery SOC of the high-power battery 3 is equal to or less than the predetermined capacity SOC1, the use of a gear shift pattern (emergency 1st: "EV 1st ICE 1st") that is present in the normally non-use gear shift pattern group is permitted. That is, when a battery low capacity condition is satisfied, there is a demand to suppress the consumption of the battery SOC of the high-power battery 3 as much as possible. In this regard, if a gear shift stage that reduces the assisting load by the first motor/generator MG1 is present in the normally non-use gear shift pattern group, it is advantageous to execute a shift control while permitting the use of a normally non-use gear shift pattern, so as to recover the battery SOC at an early stage. Therefore, if a battery low capacity condition is satisfied, an early recovery of the decreased battery SOC of the high-power battery 3 is obtained, by permitting the use of a normally non-use gear shift pattern in the shift control.

In the first embodiment, when a battery low temperature condition is established, in which the temperature of the high-power battery 3 decreases and becomes equal to or less than a first temperature threshold at which a predetermined output cannot be output, the use of a gear shift pattern (emergency 1st: "EV 1st ICE 1st") that is present in the normally non-use gear shift pattern group is permitted. That is, if the battery low temperature condition is satisfied, since the first motor/generator MG1 cannot output the predetermined output, it is necessary to reduce the assist output by the first motor/generator MG1 as much as possible. In this regard, if a gear shift pattern is present in the normally non-use gear shift pattern group, whereby the driving force provided by the MG1 output is reduced, and the output is mainly provided by the internal combustion engine, it is advantageous to use said normally non-use gear shift pattern, so as to be able to output the required vehicle driving force. Therefore, if a battery low temperature condition is satisfied, a decrease in the actual vehicle driving force with respect to the required vehicle driving force can be suppressed, by using a normally non-use gear shift pattern in the shift control.

In the first embodiment, when an electric motor system high temperature condition is established, in which the temperature of the electric motor system from the high-power battery 3 to the first motor/generator MG1 increases and becomes equal to or greater than a second temperature threshold at which a predetermined output cannot be output, the use of a gear shift pattern (emergency 1st: EV 1st ICE 1st) that is present in the normally non-use gear shift pattern group is permitted. That is, if the electric motor system high temperature condition is satisfied, since the first motor/generator MG1 cannot output the predetermined output in the same manner as when the battery low temperature condition is satisfied, it is necessary to reduce the assist output by the first motor/generator MG1 as much as possible. In this regard, if a gear shift pattern is present in the normally non-use gear shift pattern group, whereby the driving force provided by the MG1 output is reduced, and the output is mainly provided by the internal combustion engine, it is advantageous to use said normally non-use gear shift pattern, so as to be able to output the required vehicle driving force. Therefore, if the electric motor system high temperature condition is satisfied, a decrease in the actual vehicle driving force with respect to the required vehicle driving force can be suppressed, by using a normally non-use gear shift pattern in the shift control.

In the first embodiment, a malfunction occurred in which a predetermined gear shift pattern (EV 2nd ICE 3rd) cannot be selected during shift control using a gear shift pattern of the normal-use gear shift pattern group. At this time, of the gear shift patterns that are present in the normally non-use gear shift pattern group, a gear shift pattern (EV 2nd ICE 3rd') with a gear ratio close to the predetermined gear shift pattern (EV 2nd ICE 3rd) in which the malfunction has occurred is used as a malfunction gear shift pattern. That is, the shift control is carried out using a shift schedule map (FIG. 6, FIG. 12) in which gear shift pattern regions are set in consideration of fuel consumption performance and driving performance. However, if a malfunction occurs in which a predetermined gear shift pattern (EV 2nd ICE 3rd) set in the region cannot be selected, a gear shift pattern (EV 2nd ICE 3rd) will be skipped at the time of upshift as well as at the time of downshift. In this case, fuel consumption performance and driving performance are reduced. In contrast, when a gear shift pattern failure occurs, a reduction in fuel consumption performance and driving performance can be suppressed to a minimum, and the shift control can be continued as is, by using a gear shift pattern (EV 2nd ICE 3rd') with a gear ratio close to the gear shift pattern (EV 2nd ICE 3rd) in which the malfunction has occurred as a malfunction gear shift pattern.

In the first embodiment, the multistage gear transmission 1 comprises EV gear shift stages, ICE gear shift stages, and combination gear shift patterns of an EV gear shift stage and an ICE gear shift stage. In this transmission control unit 23, gear shift patterns excluding the interlock gear shift patterns and gear shift patterns that cannot be selected by the shift mechanism from among all the gear shift patterns that can be established by engagement combinations of a plurality of engagement clutches C1, C2, C3, are designated as the plurality of gear shift patterns that can be established by the multistage gear transmission 1. In the case of the combination gear shift stages, the gear shift patterns in which one engagement clutch C3 is present in the power transmission path of the EV gear shift stage and one engagement clutch C1, C2 is present in the power transmission path of the ICE gear shift stage are designated as the normal-use gear shift pattern group. Then, the gear shift patterns in which one engagement clutch C3 is present in the power transmission path of the EV gear shift stage and two or more engagement clutches C1, C2, C3 are present in the power transmission path of the ICE gear shift stage are designated as the normally non-use gear shift pattern group. That is, the shift control of the multistage gear transmission 1 can be divided into a control for changing the EV gear shift stage, and a control for changing the ICE gear shift stage. Therefore, the power transmission path is separately considered for the EV gear shift stages and the ICE gear shift stages, and gear shift patterns in which two or more engagement clutches C1, C2, C3 are present in the power transmission path of the ICE gear shift stage are designated as the normally non-use gear shift pattern group. Therefore, in a multistage gear transmission 1 comprising EV gear shift stages and ICE gear shift stages, normal-use gear shift patterns and normally non-use gear shift patterns are organized according to the number of engagement clutches in the power transmission path, from among the plurality of gear shift patterns that can be established by the multistage gear transmission 1.

Next, the effects are described. The effects listed below can be obtained by the transmission control device for a hybrid vehicle according to the first embodiment.

(1) In a hybrid vehicle comprising an electric motor (first motor/generator MG1) and an internal combustion engine ICE as drive sources, and a transmission (multistage gear transmission 1) that establishes a plurality of gear shift patterns in a drive system from the power sources to the drive wheel 19, and a transmission (multistage gear transmission 1) having a plurality of engagement clutches C1, C2, C3 as shifting elements that switch between a plurality of gear shift patterns and that are meshingly engaged by movement from a disengaged position, a transmission controller (transmission control unit 23) is provided that carries out a shift control for switching between gear shift patterns that are established by the transmission (multistage gear transmission 1) by a movement of the engagement clutches based on a gear shift request, and the transmission controller (transmission control unit 23) selects gear shift patterns (EV first gear stage: 1-2 speed, ICE gear shift stage: 2-4 speed) from among a plurality of gear shift patterns that can be established by the transmission (multistage gear transmission 1) in which one of the engagement clutches is present in a power transmission path leading from the power sources to the drive wheel 19, and designates the selected gear shift patterns as a normal-use gear shift pattern group, which is used for shift control under normal conditions. Accordingly, when there is a gear shift request, it is possible to ensure gear shift responsiveness corresponding to a driver's request while achieving excellent gear shifting quality when shifting gears in normal conditions.

(2) The transmission controller (transmission control unit 23) selects gear shift patterns (EV 1st ICE 1st, EV 2nd ICE 3rd') from among a plurality of gear shift patterns that can be established by the transmission (multistage gear transmission 1) in which two or more engagement clutches C1, C2, C3 are present in the power transmission path, designates the selected gear shift patterns as a normally non-use gear shift pattern group, and permits the use of a gear shift pattern (EV 1st ICE 1st, EV 2nd ICE 3rd') of the normally non-use gear shift pattern group, when a predetermined condition is satisfied. Accordingly, in addition to the effect of (1), when a predetermined condition is satisfied, by permitting the use of a gear shift pattern of the normally non-use gear shift pattern group, a normally non-use gear shift pattern is effectively used as a backup gear shift pattern of a normal-use gear shift pattern.

(3) When a battery low capacity condition is established, in which the charge capacity (battery SOC) of the battery (high-power battery 3) is equal to or less than a predetermined capacity SOC1, the transmission controller (transmission control unit 23) permits use of a gear shift pattern (EV 1st ICE 1st) that is present in the normally non-use gear shift pattern group. Accordingly, in addition to the effect of (2), if a battery low capacity condition is satisfied, an early recovery of the decreased charge capacity (battery SOC) of the battery (high-power battery 3) is obtained, by permitting the use of a normally non-use gear shift pattern in the shift control.

(4) When a battery low temperature condition is established, in which the temperature of the battery (high-power battery 3) decreases and becomes equal to or less than a first temperature threshold at which a predetermined output cannot be output, the transmission controller (transmission control unit 23) permits use of a gear shift pattern (emergency 1st: "EV 1st ICE 1st") that is present in the normally non-use gear shift pattern group (FIG. 5, S2→S5). Accordingly, in addition to the effect of (2) or (3), if a battery low temperature condition is satisfied, a decrease in the actual vehicle driving force with respect to the required vehicle driving force can be suppressed, by using a normally non-use gear shift pattern in the shift control.

(5) When an electric motor system high temperature condition is established, in which the temperature of the electric motor system from the battery (high-power battery 3) to the electric motor (first motor/generator MG1) increases and becomes equal to or greater than a second temperature threshold at which a predetermined output cannot be output, the transmission controller (transmission control unit 23) permits use of a gear shift pattern (emergency 1st: EV 1st ICE 1st) that is present in the normally non-use gear shift pattern group. Accordingly, in addition to the effects of (2) to (4), if the electric motor system high temperature condition is satisfied, a decrease in the actual vehicle driving force with respect to the required vehicle driving force can be suppressed, by using a normally non-use gear shift pattern in the shift control.

(6) Upon determining a malfunction occurs in which a predetermined gear shift pattern (EV 2nd ICE 3rd) cannot be selected during shift control using a gear shift pattern of the normal-use gear shift pattern group, the transmission controller (transmission control unit 23) uses a gear shift pattern (EV 2nd ICE 3rd') of the gear shift stages that are present in the normally non-use gear shift pattern group as a malfunction gear shift pattern (FIG. 5, S6→S7→S8) a gear shift pattern (EV 2nd ICE 3rd') with a gear ratio close to the predetermined gear shift pattern (EV 2nd ICE 3rd) in which the malfunction has occurred. Accordingly, in addition to the effects of (2) to (5), when a gear shift stage failure occurs, reduction in the fuel consumption performance and driving performance can be suppressed to a minimum, and the shift control can be continued as is, by using a gear shift pattern (EV 2nd ICE 3rd') with a gear ratio close to the gear shift pattern (EV 2nd ICE 3rd) in which the malfunction has occurred as a malfunction gear shift pattern.

(7) The transmission (multistage gear transmission 1) comprises a plurality of EV gear shift stages that are electric motor gear shift stages, a plurality of ICE gear shift stages that are internal combustion engine gear shift stages, and a plurality of combination gear shift patterns of an EV gear shift stage and an ICE gear shift stage, the transmission controller (transmission control unit 23), designates gear shift patterns excluding interlock gear shift patterns and gear shift patterns that cannot be selected by the shift mechanism from among all the gear shift patterns that can be established by engagement combinations of a plurality of engagement clutches C1, C2, C3 as the plurality of gear shift patterns that can be established by the transmission (multistage gear transmission 1), and in a case of the combination gear shift patterns, the gear shift patterns in which one engagement clutch C3 is present in the power transmission path of the EV gear shift stage and one engagement clutch C1, C2 is present in the power transmission path of the ICE gear shift stage are designated as the normal-use gear shift pattern group, and the gear shift patterns in which one engagement clutch C3 is present in the power transmission path of the EV gear shift stage and two or more engagement clutches C1, C2, C3 are present in the power transmission path of the ICE gear shift stage are designated as the normally non-use gear shift pattern group (FIG. 4). Accordingly, in addition to the effects of (1) to (6), in a transmission (multistage gear transmission 1) comprising EV gear shift stages and ICE gear shift stages, normal-use gear shift patterns and normally non-use gear shift patterns are organized according to the number of engagement clutches in the power transmission path, from among the plurality of gear shift patterns that can be established by the transmission (multistage gear transmission 1).

The transmission control device for a hybrid vehicle of the present invention was described above based on the first embodiment, but specific configurations thereof are not limited to the first embodiment, and various modifications and additions to the design can be made without departing from the scope of the invention according to each of the Claims.

In the first embodiment, an example of a transmission controller was shown in which, gear shift patterns excluding the interlock gear shift patterns and gear shift patterns that cannot be selected by the shift mechanism from among all the gear shift patterns that can be established by engagement combinations of a plurality of engagement clutches C1, C2, C3, are designated as the plurality of gear shift patterns that can be established by the multistage gear transmission 1. However, the transmission controller may be configured such that gear shift patterns excluding the interlock gear shift patterns from among all the gear shift patterns that can be established by engagement combinations of a plurality of engagement clutches are designated as the plurality of gear shift patterns that can be established by the transmission. For example, if the shift mechanism is configured as a mechanism that causes each of the engagement clutches C1, C2, C3 to carry out a movement independently, there will be no "gear shift patterns that cannot be selected by the shift mechanism." In this case, there will be more gear shift patterns that are used as gear shift patterns during malfunction.

In the first embodiment, an example of a multistage gear transmission 1, which uses engagement clutches C1, C2, C3, and which has EV gear shift stages (1-2 speed), ICE gear shift stages (1-4 speed), and combination gear shift patterns of an EV gear shift stage and an ICE gear shift stage, was shown as the transmission. However, the transmission may be a multistage gear transmission that uses one, two, four, or more engagement clutches, and that has EV gear shift stages, ICE gear shift stages, and combination gear shift patterns of an EV gear shift stage and an ICE gear shift stage, that are different from the first embodiment. Furthermore, the transmission may be a combination transmission of an EV transmission that uses an engagement clutch and an ICE transmission that uses an engagement clutch.

In the first embodiment, an example was shown in which the transmission control device of the present invention is applied to a hybrid vehicle comprising, one engine, two motor/generators, and a multistage gear transmission having three engagement clutches as drive system components. However, the transmission control device of the present invention may be applied to a hybrid vehicle comprising one engine, at least one motor/generator, and a transmission having at least one engagement clutch.

The invention claimed is:

1. A hybrid vehicle transmission control device for a hybrid vehicle comprising an electric motor and an internal combustion engine as drive sources, and a transmission that establishes a plurality of gear shift patterns in a drive system from the power sources to a drive wheel, and the transmission having a plurality of engagement clutches as shifting elements that switch between a plurality of gear shift patterns and that are meshingly engaged by movement from a disengaged position, the transmission control device comprising:
a transmission controller that carries out a shift control for switching between the plurality of gear shift patterns that are established by the transmission by the movement of the engagement clutches based on a gear shift request, and
the transmission controller selects gear shift patterns from among the plurality of gear shift patterns that can be established by the transmission gear shift patterns in which one of the engagement clutches is present in a power transmission path leading from the power sources to the drive wheel, and designates the selected gear shift patterns as a normal-use gear shift pattern group that is used for shift control under normal conditions.

2. The hybrid vehicle transmission control device according to claim 1, wherein
the transmission controller selects gear shift patterns from among the plurality of gear shift patterns that can be established by the transmission in which two or more of the engagement clutches are present in the power transmission path, designates the selected gear shift patterns as a normally non-use gear shift pattern group, and permits use of the gear shift patterns of the normally non-use gear shift pattern group upon determining a predetermined condition is satisfied.

3. The hybrid vehicle transmission control device according to claim 2, wherein
upon determining a battery low capacity condition is established in which a charge capacity of a battery is equal to or less than a predetermined capacity, the transmission controller permits use of the gear shift patterns that are present in the normally non-use gear shift pattern group.

4. The hybrid vehicle transmission control device according to claim 3, wherein
upon determining a battery low temperature condition is established in which a temperature of a battery decreases and becomes equal to or less than a first temperature threshold at which a predetermined output cannot be output, the transmission controller permits use of the gear shift patterns that are present in the normally non-use gear shift pattern group.

5. The hybrid vehicle transmission control device according to claim 3, wherein
upon determining a malfunction occurs in which a predetermined gear shift pattern cannot be selected during shift control using one of the gear shift patterns of the normal-use gear shift pattern group, the transmission controller uses of one of the gear shift patterns that are present in the normally non-use gear shift pattern group as a malfunction gear shift pattern which has a gear ratio that is close to the predetermined gear shift pattern in which the malfunction has occurred.

6. The hybrid vehicle transmission control device according to claim 3, wherein
upon determining an electric motor system high temperature condition is established in which a temperature of an electric motor system from a battery to the electric motor increases and becomes equal to or greater than a second temperature threshold at which a predetermined output cannot be output, the transmission controller permits use of the gear shift pattern that are present in the normally non-use gear shift pattern group.

7. The hybrid vehicle transmission control device according to claim 3, wherein
the transmission comprises a plurality of EV gear shift stages that are electric motor gear shift stages, a plurality of ICE gear shift stages that are internal combustion engine gear shift stages, and a plurality of combination gear shift patterns of an EV gear shift stage and an ICE gear shift stage,
the transmission controller designates gear shift patterns excluding interlock gear shift patterns and gear shift patterns that cannot be selected by the shift mechanism from among all the gear shift patterns that can be established by engagement combinations of the plurality of engagement clutches as a plurality of gear shift patterns that can be established by the transmission, and
in a case of the combination gear shift patterns, the gear shift patterns in which one of the engagement clutch is present in the power transmission path of the EV gear shift stage and one of the engagement clutches is present in the power transmission path of the ICE gear shift are designated as the normal-use gear shift pattern group, and the gear shift patterns in which one of the engagement clutches is present in the power transmission path of the EV gear shift stage and two or more of the engagement clutches are present in the power transmission path of the ICE gear shift stage are designated as the normally non-use gear shift pattern group.

8. The hybrid vehicle transmission control device according to claim 2, wherein upon determining a battery low temperature condition is established in which a temperature of a battery decreases and becomes equal to or less than a first temperature threshold at which a predetermined output cannot be output, the transmission controller permits use of the gear shift patterns that are present in the normally non-use gear shift pattern group.

9. The hybrid vehicle transmission control device according to claim 8, wherein upon determining a malfunction occurs in which a predetermined gear shift pattern cannot be selected during shift control using one of the gear shift patterns of the normal-use gear shift pattern group, the transmission controller uses of one of the gear shift patterns that are present in the normally non-use gear shift pattern group as a malfunction gear shift pattern which has a gear ratio that is close to the predetermined gear shift pattern in which the malfunction has occurred.

10. The hybrid vehicle transmission control device according to claim 8, wherein upon determining an electric motor system high temperature condition is established in which a temperature of an electric motor system from a battery to the electric motor increases and becomes equal to or greater than a second temperature threshold at which a predetermined output cannot be output, the transmission controller permits use of the gear shift pattern that are present in the normally non-use gear shift pattern group.

11. The hybrid vehicle transmission control device according to claim 8, wherein the transmission comprises a plurality of EV gear shift stages that are electric motor gear shift stages, a plurality of ICE gear shift stages that are internal combustion engine gear shift stages, and a plurality of combination gear shift patterns of an EV gear shift stage and an ICE gear shift stage, the transmission controller designates gear shift patterns excluding interlock gear shift patterns and gear shift patterns that cannot be selected by the shift mechanism from among all the gear shift patterns that can be established by engagement combinations of the plurality of engagement clutches as a plurality of gear shift patterns that can be established by the transmission, and in a case of the combination gear shift patterns, the gear shift patterns in which one of the engagement clutch is present in the power transmission path of the EV gear shift stage and one of the engagement clutches is present in the power transmission path of the ICE gear shift are designated as the normal-use gear shift pattern group, and the gear shift patterns in which one of the engagement clutches is present in the power transmission path of the EV gear shift stage and two or more of the engagement clutches are present in the power transmission path of the ICE gear shift stage are designated as the normally non-use gear shift pattern group.

12. The hybrid vehicle transmission control device according to claim 2, wherein upon determining a malfunction occurs in which a predetermined gear shift pattern cannot be selected during shift control using one of the gear shift patterns of the normal-use gear shift pattern group, the transmission controller uses of a gear shift pattern of the gear shift patterns that are present in the normally non-use gear shift pattern group as a malfunction gear shift pattern which has a gear ratio that is close to the predetermined gear shift pattern in which the malfunction has occurred.

13. The hybrid vehicle transmission control device according to claim 2, wherein upon determining an electric motor system high temperature condition is established in which a temperature of an electric motor system from a battery to the electric motor increases and becomes equal to or greater than a second temperature threshold at which a predetermined output cannot be output, the transmission controller permits use of the gear shift pattern that are present in the normally non-use gear shift pattern group.

14. The hybrid vehicle transmission control device according to claim 2, wherein the transmission comprises a plurality of EV gear shift stages that are electric motor gear shift stages, a plurality of ICE gear shift stages that are internal combustion engine gear shift stages, and a plurality of combination gear shift patterns of an EV gear shift stage and an ICE gear shift stage, the transmission controller designates gear shift patterns excluding interlock gear shift patterns and gear shift patterns that cannot be selected by the shift mechanism from among all the gear shift patterns that can be established by engagement combinations of the plurality of engagement clutches as a plurality of gear shift patterns that can be established by the transmission, and in a case of the combination gear shift patterns, the gear shift patterns in which one of the engagement clutch is present in the power transmission path of the EV gear shift stage and one of the engagement clutches is present in the power transmission path of the ICE gear shift are designated as the normal-use gear shift pattern group, and the gear shift patterns in which one of the engagement clutches is present in the power transmission path of the EV gear shift stage and two or more of the engagement clutches are present in the power transmission path of the ICE gear shift stage are designated as the normally non-use gear shift pattern group.

15. The hybrid vehicle transmission control device according to claim 1, wherein upon determining an electric motor system high temperature condition is established in which a temperature of an electric motor system from a battery to the electric motor increases and becomes equal to or greater than a second temperature threshold at which a predetermined output cannot be output, the transmission controller permits use of the gear shift pattern that are present in the normally non-use gear shift pattern group.

16. The hybrid vehicle transmission control device according to claim 15, wherein upon determining a malfunction occurs in which a predetermined gear shift pattern cannot be selected during shift control using one of the gear shift patterns of the normal-use gear shift pattern group, the transmission controller uses of one of the gear shift patterns that are present in the normally non-use gear shift pattern group as a malfunction gear shift pattern which has a gear ratio that is close to the predetermined gear shift pattern in which the malfunction has occurred.

17. The hybrid vehicle transmission control device according to claim 1, wherein
the transmission comprises a plurality of EV gear shift stages that are electric motor gear shift stages, a plurality of ICE gear shift stages that are internal combustion engine gear shift stages, and a plurality of combination gear shift patterns of an EV gear shift stage and an ICE gear shift stage,
the transmission controller designates gear shift patterns excluding interlock gear shift patterns and gear shift patterns that cannot be selected by the shift mechanism from among all the gear shift patterns that can be established by engagement combinations of the plurality of engagement clutches as a plurality of gear shift patterns that can be established by the transmission, and
in a case of the combination gear shift patterns, the gear shift patterns in which one of the engagement clutch is present in the power transmission path of the EV gear shift stage and one of the engagement clutches is present in the power transmission path of the ICE gear shift are designated as the normal-use gear shift pattern group, and the gear shift patterns in which one of the engagement clutches is present in the power transmission path of the EV gear shift stage and two or more of the engagement clutches are present in the power transmission path of the ICE gear shift stage are designated as the normally non-use gear shift pattern group.

* * * * *